United States Patent
Rudy et al.

(10) Patent No.: US 10,229,145 B2
(45) Date of Patent: Mar. 12, 2019

(54) BUILDING OF A HASH TABLE

(71) Applicant: INTERNATIONAL BUSINESS MACHINES CORPORATION, Armonk, NY (US)

(72) Inventors: Raymond H. Rudy, Tokyo (JP); Takanori Ueda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 14/841,458

(22) Filed: Aug. 31, 2015

(65) Prior Publication Data

US 2017/0060866 A1 Mar. 2, 2017

(51) Int. Cl.
*G06F 17/30* (2006.01)

(52) U.S. Cl.
CPC .................. *G06F 17/3033* (2013.01)

(58) Field of Classification Search
None
See application file for complete search history.

(56) References Cited

U.S. PATENT DOCUMENTS

| | | | |
|---|---|---|---|
| 7,058,639 B1* | 6/2006 | Chatterjee | G06F 17/3033 |
| 8,266,116 B2 | 9/2012 | Agrawal et al. | |
| 8,606,791 B2 | 12/2013 | Ostrovsky | |
| 8,938,469 B1 | 1/2015 | Keen et al. | |
| 2008/0215849 A1 | 9/2008 | Scott | |
| 2014/0325160 A1* | 10/2014 | Lim | G06F 12/0871 |
| | | | 711/136 |

FOREIGN PATENT DOCUMENTS

| CN | 101692651 A | 4/2010 |
|---|---|---|
| CN | 104113606 A | 10/2014 |

OTHER PUBLICATIONS

Huang, K. et al., "Fast and deterministic hash table lookup using discriminative bloom filters," Journal of Network and Computer Applications, vol. 36, Issue 2, Mar. 2013. (pp. 657-666).
Istvan, Z., et al., "A flexible hash table design for 10GBPS key-value stores on FPGAS," 23rd International Conference on Field Programmable Logic and Applications (FPL), Sep. 2013. (pp. 1-8).
Pus, V. et al., "Using DSP blocks to compute CRC hash in FPGA (Abstract Only)," Proceedings of the 2014 ACM/SIGDA international symposium on Field-programmable gate arrays, Feb. 2014. (pp. 1-2).
International Search Report issued in PCT/IB2016/055037 dated Nov. 24, 2016, 12 pages.

* cited by examiner

*Primary Examiner* — Anhtai V Tran
(74) *Attorney, Agent, or Firm* — Tutunjian & Bitetto, P.C.; Vazken Alexanian

(57) ABSTRACT

A method, a computer system, and/or a computer program product are disclosed. One computer-implemented method for building a hash table includes dividing a hash table into plural blocks; and dividing each block into plural sub-blocks. A certain sub-block uses a first pattern of association between a key and a location for storing the key. Another sub-block which belongs to the same block having the certain sub-block uses a second pattern which is different from the first pattern. The method may further include building a hash table by using memory blocks in a Field Programmable Gate Array.

24 Claims, 24 Drawing Sheets

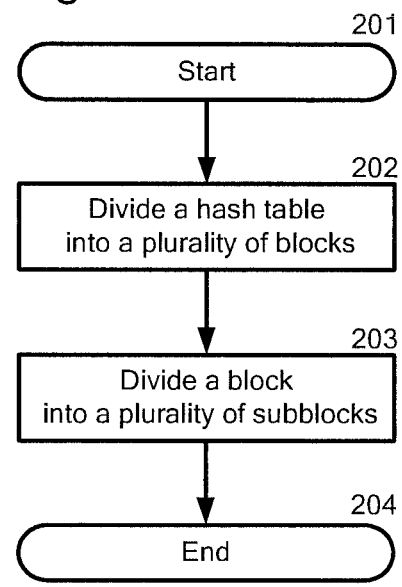

Fig. 3B

| | Sub-block 1 | 321 |
|---|---|---|
| 0 | Key 0 | Data 0 |
| 1 | Key 1 | Data 1 |
| 2 | Key 2 | Data 2 |
| | ⋮ | |
| 255 | Key 255 | Data 255 |

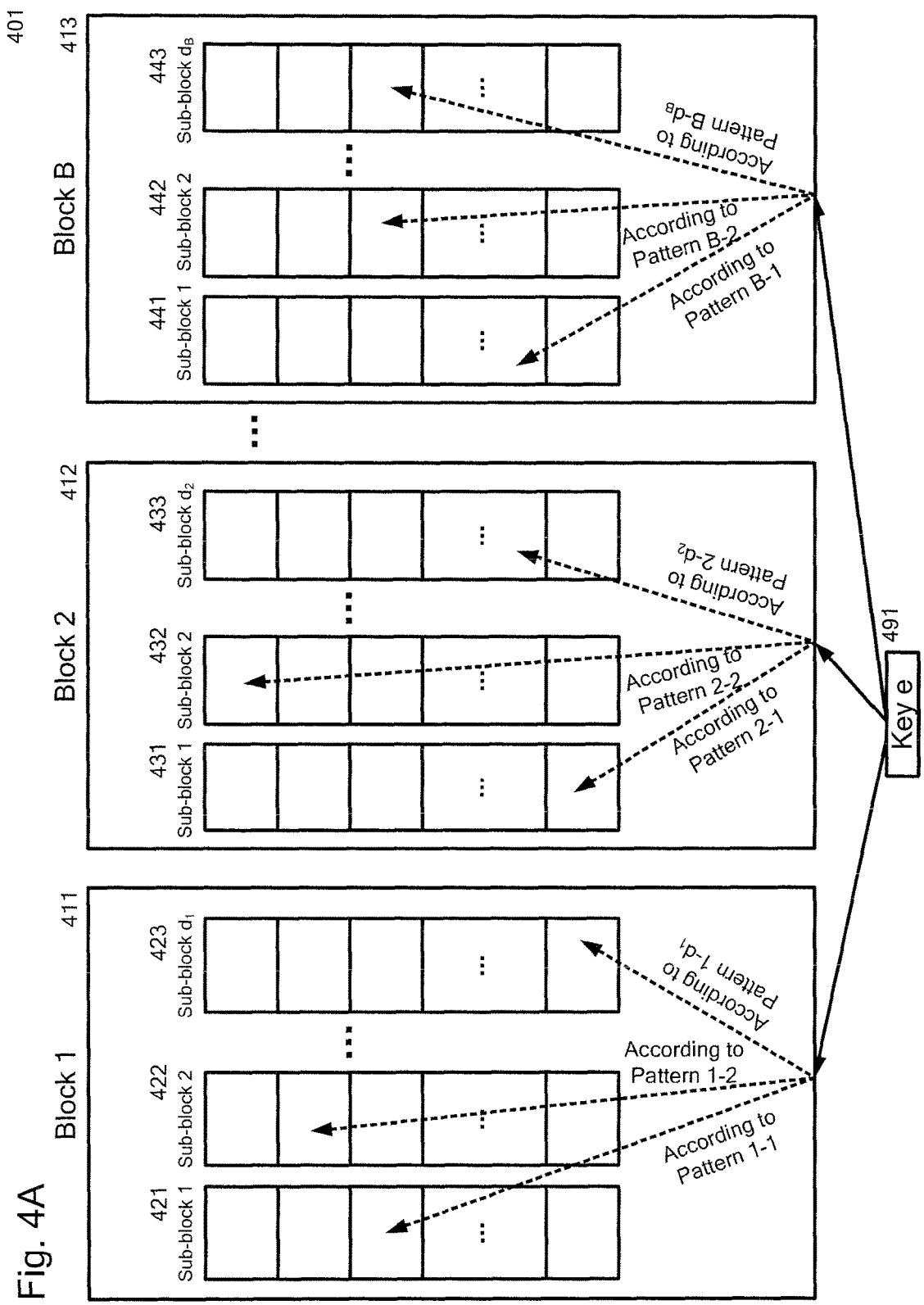

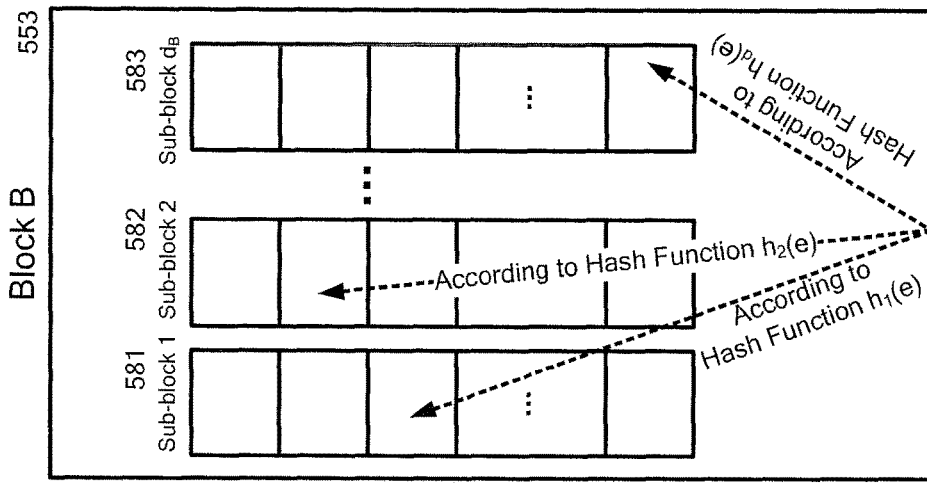
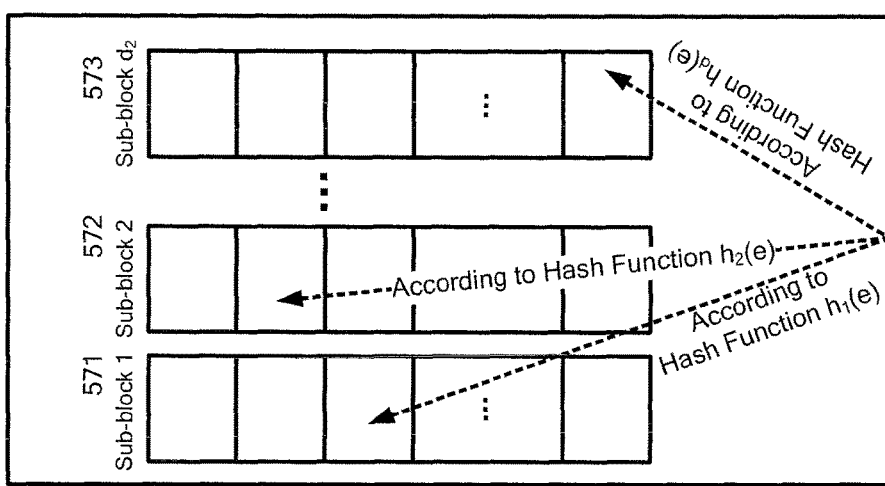
Fig. 5B

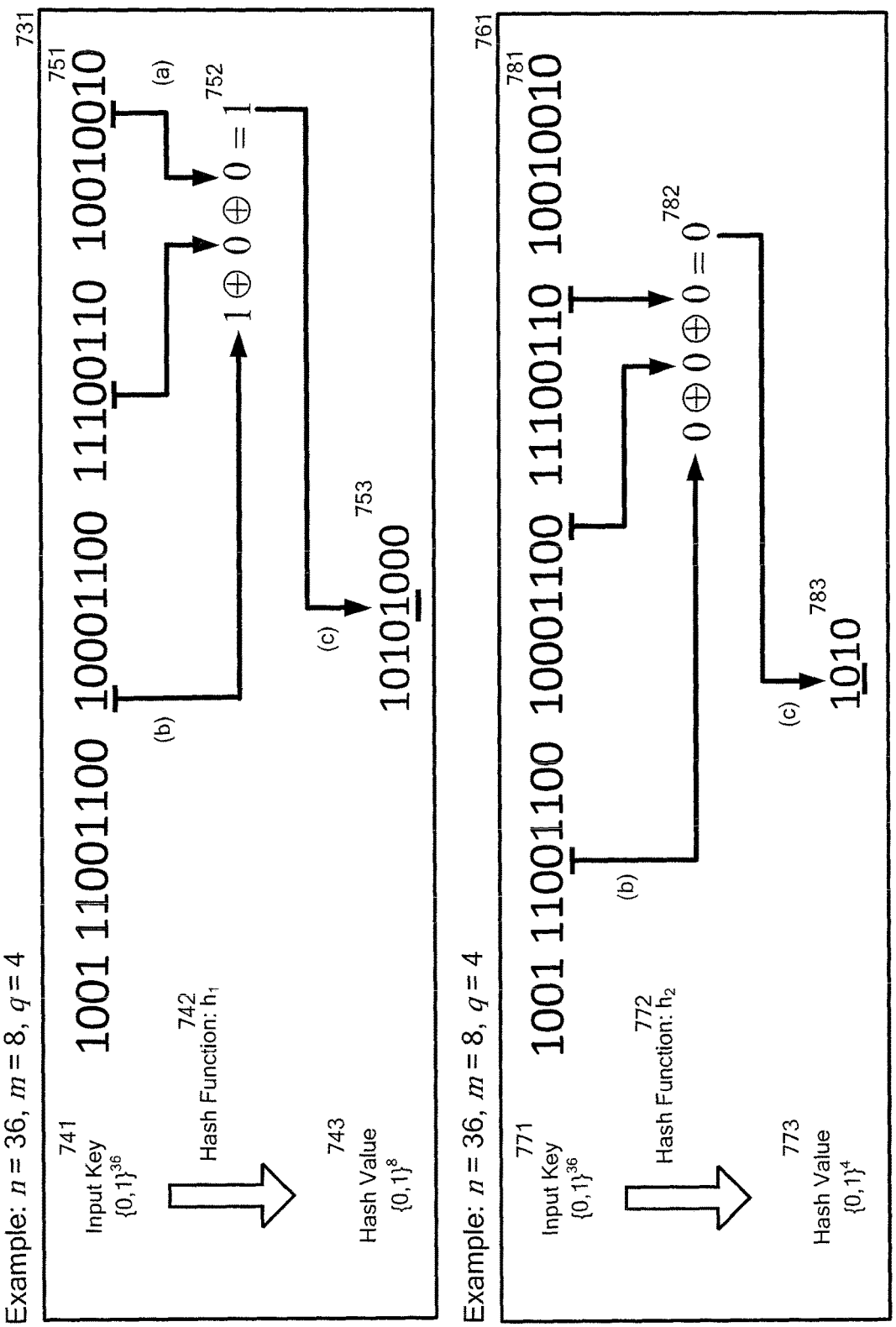

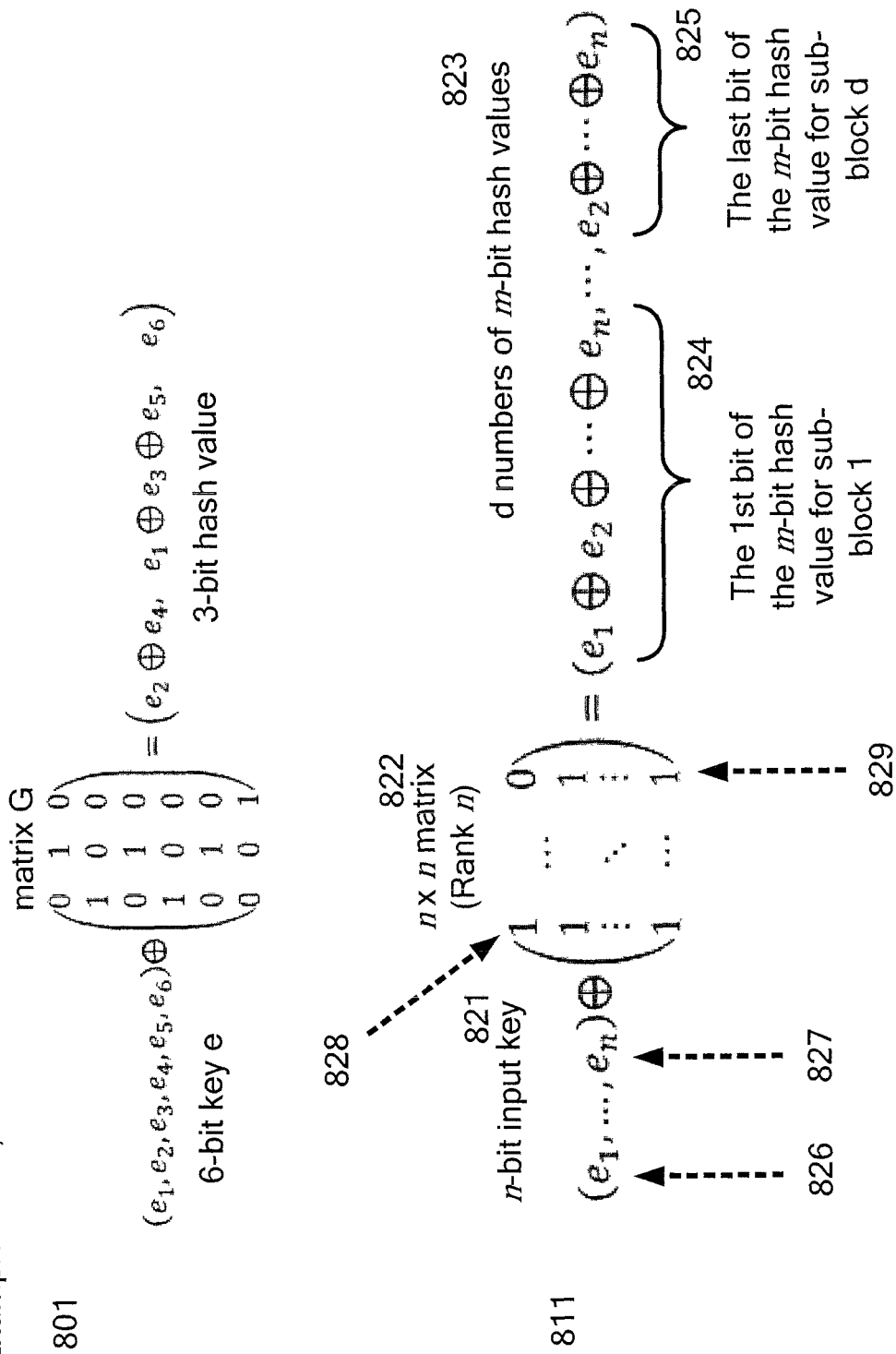

Fig. 13

BUILDING OF A HASH TABLE

BACKGROUND

Technical Field

This invention relates to a hash table. Especially, this invention relates to a technique for building a hash table.

Description of the Related Art

As a method of storing keys in a hash table with high space efficiency, there is known a method called multi-level hash table (MHT) that divides a hash table into multiple blocks by using different hash functions to improve the space efficiency (see Non Patent Literatures 1 and 2 described below).
Non-Patent Literature 1: Andrei Z. Broder et. al., "Multi-level Adaptive Hashing", SODA'90 Proceedings of the first annual ACM-SIAM symposium on Discrete algorithms, pp. 43-53, January 1990,
Non-Patent Literature 2: Adam Kirsch et. al., "The Power of One Move: Hashing Schemes for Hardware", IEEE/ACM Transactions on Networking (TON), Vol. 18, No. 6, December 2010, which can be downloadable from <URL: http://www.eecs.harvard.edu/~michaelm/postscripts/infocom_hardware_submit.pdf>

SUMMARY

A Field Programmable Gate Array (FPGA) is a semiconductor device, the inside of which is programmable in the field after manufacturing and in which a large number of logic gates are arrayed. If a hash table (also called "an associative memory") can be built on the FPGA, the hash table can be used in a high-throughput processing by making use of the parallel computation ability of the FPGA.

However, the internal memory of the FPGA has a configuration in which a large number of small-capacity memory blocks are disposed. In general, a hash table has to rebuild the table when the space efficiency and throughput decrease due to hash collisions. The FPGA must suspend data processing while a re-building is in progress, which is another common cause of throughput degradation. In addition, the rebuild mechanism increases the number of logics required to implement a hash table in the FPGA. Although the characteristics of the input keys such as the deviation and randomness are useful in optimizing the hash function in order to reduce the number of rebuild operations, the characteristics of the input keys are sometimes unknown beforehand. Even if the characteristics of the keys are known, a reprogramming of the FPGA is necessary to optimize the hash function according to the characteristics. However, it is difficult to perform a reprogramming when the FPGA is running.

As a method of storing keys in a hash table with a high space efficiency, there is known a method called a multi-level hash table (MHT) that divides a hash table into multiple blocks by using different hash functions to improve the space efficiency. MHT can also reduce the number of, or avoid rebuild operations. However, there are problems explained below in deploying the multi-level hash table in the FPGA.

(1) Guaranteeing lower bound of space efficient is indispensable to determine the maximum number of keys that the hash table can hold in the FPGA in the worst case. The worst number is important information for hardware designers to ensure the hash table can hold all of the keys that appear during data processing;

(2) A different hash function is necessary for each of an enormous number of memory blocks typically exceeding one thousand; and (3) It is desirable that a hash function can calculate a hash value within one clock for maximizing throughput. Therefore, it is necessary to avoid a complicated operation such as multiplication that requires multiple clocks to complete one calculation.

A framework called a universal hashing for generating a large number of hash functions is known. However, the hash functions generated by the universal hashing framework typically use multiplication and remainder calculation that requires multiple clocks to complete one calculation. FPGAs have digital signal processors (DSP) for accelerating multiplication and remainder calculation. However, a DSP cannot complete a multiplication or remainder calculation within one clock. Moreover, the number of DSPs that an FPGA has is considerably smaller than the number of memory blocks in the FPGA. Thus, if the FPGA uses the universal hashing framework, the FPGA cannot satisfy the request for completing a hash-value calculation within one clock.

In the following Non Patent Literature 3, an approximate associative memory (hash table) is implemented on an FPGA. However, in Non Patent Literature 3, since an approximate data storing method is used, accurate data retrieval sometimes cannot be performed. Therefore, when accuracy is requested, the associative memory of Non Patent Literature 3 cannot be used.
Non-Patent Literature 3: Udit Dhawan et. al., "Area-Efficient Near-Associative Memories on FPGAs", FPGA 2013 Proceedings of the ACM/SIGDA international symposium on Field programmable gate arrays, pp. 191-200, February 2013

As a hashing method, locality sensitive hashing (LSH) is known. In the LSH, hash vales of close data are mapped to close hash values. However, the LSH does not guarantee appearance of all patterns of hash values that can be output.

Therefore, it is an object of the present invention to solve the problems mentioned above, including items (1) to (3) described above, and to provide a hash table having a space-efficiency and high-throughput by using memory area such as the small-capacity memory blocks of for example, but not limited to, an FPGA.

Further, it is an object of the present invention to provide a hash table which guarantees memory space-efficiency not only for uniform random key sequences, but also for the worst case key sequences.

Further, it is an object of the present invention to provide an avoidance of an expensive re-building of a hash table.

According to one aspect of the present invention, one embodiment of the present invention provides a computer-implemented method for building a hash table. The method comprises dividing a hash table into plural blocks; and dividing each block into plural sub-blocks. A certain sub-block uses a first pattern of association between a key and a location for storing the key. Another sub-block which belongs in the same block comprising the certain sub-block uses a second pattern which is different from the first pattern.

According to another aspect of the present invention, a system such as a computer system comprising a computer readable storage medium storing a program of instructions executable by the system to perform one or more methods described herein may be provided.

According to another aspect of the present invention, a computer program product comprising a computer readable storage medium storing a program of instructions executable by the system to perform one or more methods described herein also may be provided.

According to the present invention, the problem mentioned above, including items (1) to (3) are solved.

The overview of the present invention explained above does not enumerate all necessary features of the present invention. It should be noted that combinations or sub-combinations of these constituent elements can also be the present invention.

It goes without saying that those skilled in the art could easily assume various changes such as combining hardware components of the computer used in one embodiment of the present invention with a plurality of machines and distributing functions to the machines and implementing the functions. Those changes are concepts naturally included in the idea of the present invention. However, these constituent elements are illustrations and not all the constituent elements are essential constituent elements of the present invention.

The present invention can be realized as hardware, software, or a combination of the hardware and the software. Typical examples of execution by the combination of the hardware and the software include execution of the computer program in a computer installed with the computer program. In such a case, the computer program is loaded to a memory of the computer and executed, whereby the computer program controls the computer to execute processing according to the present invention. The computer program can be configured from a command group that can be expressed by any language, code, or notation. Such a command group enables the computer to execute a specific function directly or after one or both of (a) conversion into another language, code, or notation and (b) copying to another media are performed.

BRIEF DESCRIPTION OF THE DRAWINGS

FIG. 2 illustrates one embodiment of a flowchart of a process for building a hash table.

FIG. 3B illustrates one embodiment of a sub-block which belongs to a block in the hash table described in FIG. 3A.

FIGS. 4A and 4B respectively illustrate one embodiment of hash tables built by the flowchart of the process described in FIG. 2 and mapping patterns of association between a key and a location for storing the key.

FIGS. 5A and 5B illustrate embodiments of hash tables built by the flowchart of the process described in FIG. 2 and sub-blocks which use hash functions for determining a mapping pattern of association between a key and a location for storing the key.

FIGS. 7A and 7B respectively illustrate one embodiment of hash values generated according to one embodiment of the present invention and a diagram for how to calculate the seventh bit among the 8 bits (a first bit to an eighth bit) of the hash value.

FIGS. 8A and 8B illustrate embodiments of a hash function which calculates a hash value by XOR operations of the bits selected from the key.

FIG. 13 illustrates one embodiment of a diagram for inserting a key into a position in a sub-block which belongs to a block.

DETAILED DESCRIPTION

Figure 1:
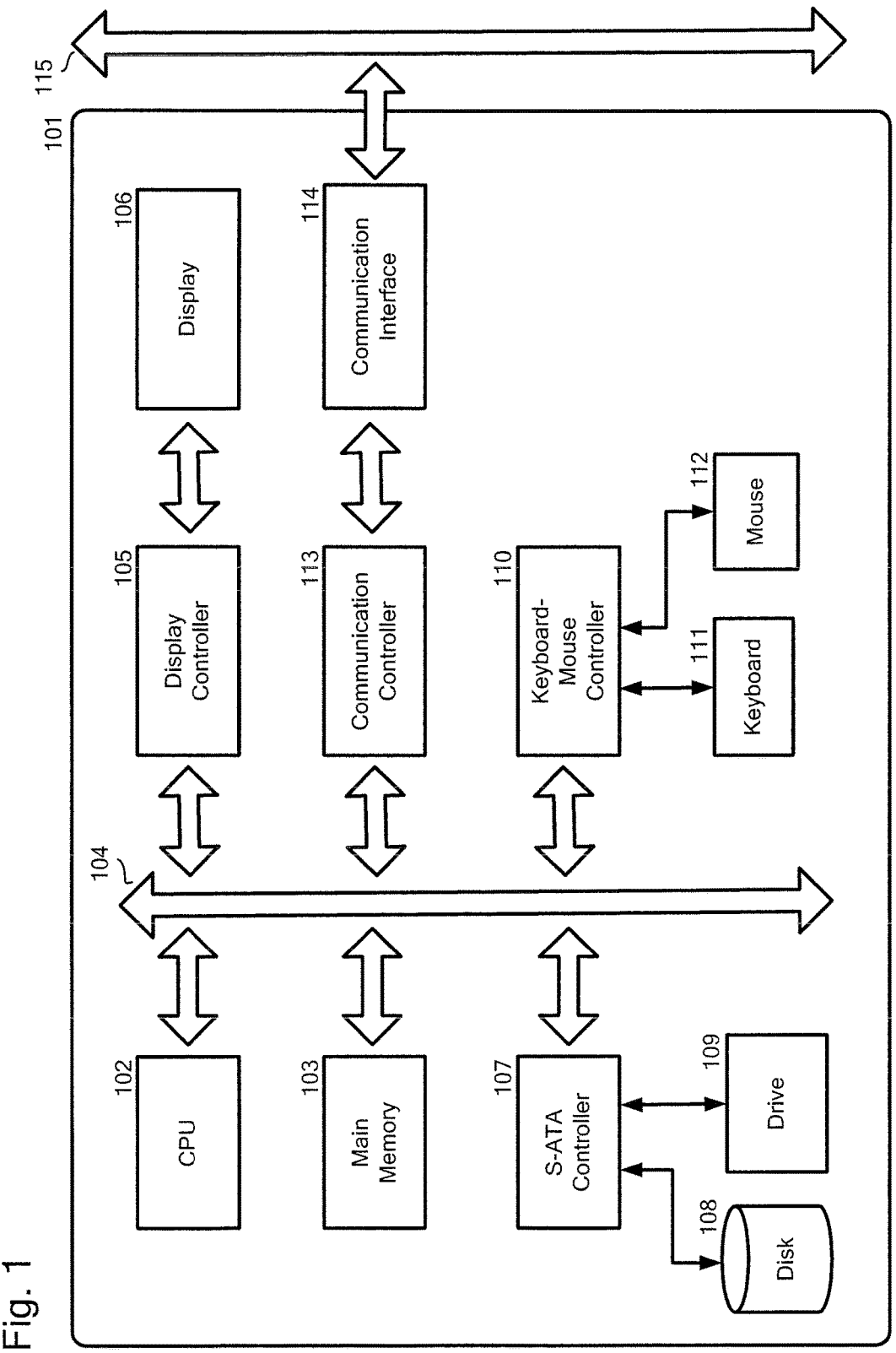
FIG. 1 illustrates an exemplified basic block diagram of a computer hardware used in one embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

An embodiment of the present invention is explained below with reference to the drawings. Throughout the drawings referred to below, the same reference numerals and signs denote the same targets unless specifically noted otherwise. Please understand that the embodiment of the present invention is an embodiment for explaining a preferred mode of the present invention and is not intended to limit the scope of the present invention to the scope explained in the embodiment.

With reference now to FIG. 1, FIG. 1 illustrates an exemplified basic block diagram of a computer hardware used in one embodiment of the present invention.

A computer (101) may be, for example, but is not limited to, a desktop, a laptop, a notebook, a tablet, a smartphone, a mobile phone or a server computer. The server computer may be, for example, but is not limited to, a workstation, a rack-mount type server, a blade type server, or a mainframe server and may run, for example, a hypervisor for creating and running one or more virtual machines. The computer (101) comprises one or more CPUs (102) and a main memory (103) connected to a bus (104). The CPU (102) is preferably based on a 32-bit or 64-bit architecture. The CPU (102) is, for example, but is not limited to, the Power® series of International Business Machines Corporation; the Core i™ series, the Core2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data is stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of one embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but not limited to, IEEE® 802.11a/b/g/n ("IEEE" is a registered trademark of Institute of Electrical and Electronics Engineers, Inc. in the United States, other countries, or both).

With reference now to FIG. 2, FIG. 2 illustrates one embodiment of a flowchart of a process for building a hash table.

A system such as the computer (101) performs the process described in FIG. 2. The system may be implemented as a single computer or a plurality of computers.

In step 201, the system starts the process for building a hash table.

Figure 10:
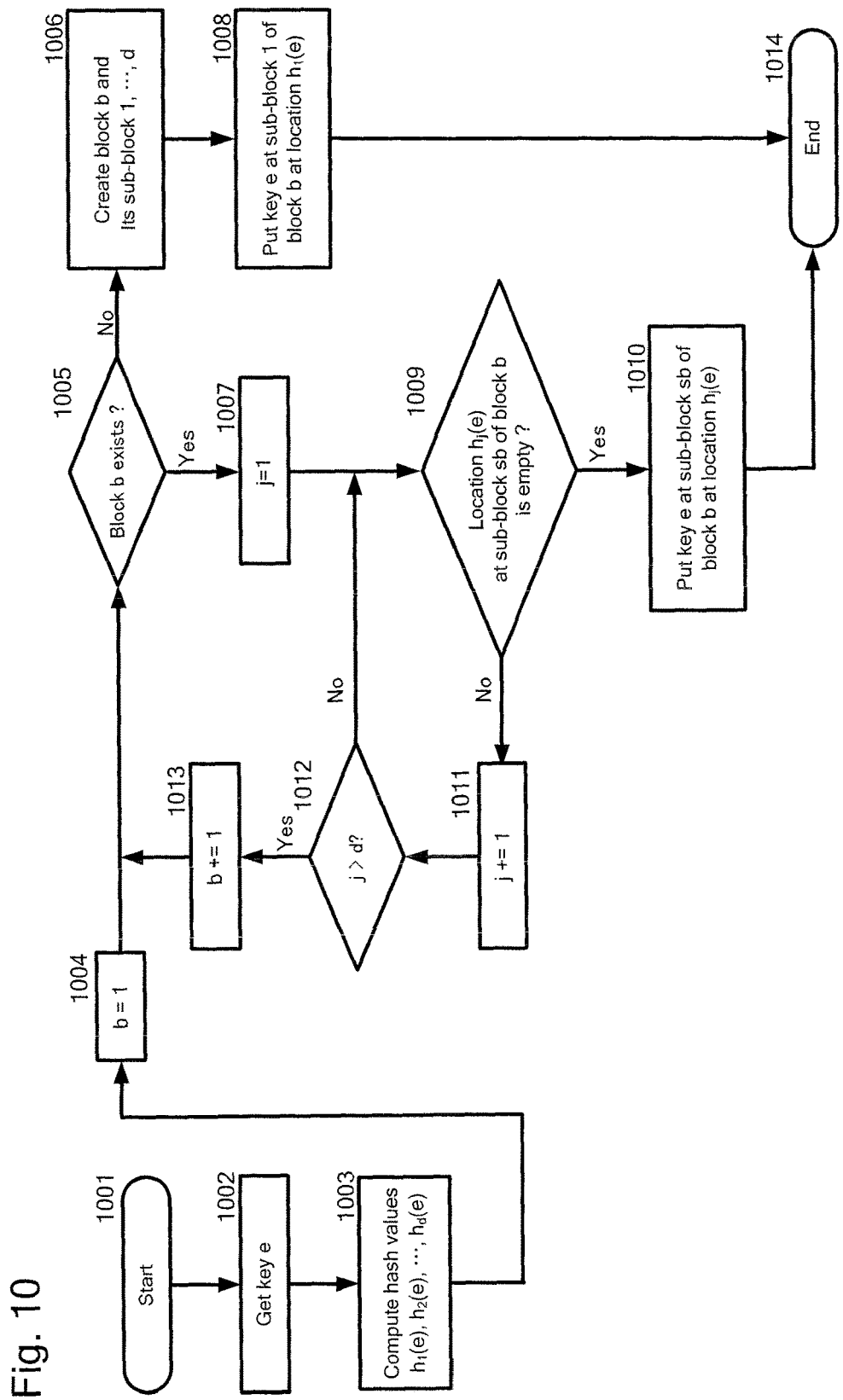
FIG. 10 illustrates one embodiment of a flowchart of a process for inserting a key into a position in a sub-block which belongs to a block.

In step 202, the system may prepare a hash table in a memory, such as a memory block. The hash table may be prepared, for example, when the hash table is required for inserting a key into the hash table, as seen in FIG. 10 mentioned below. The memory is for example, but not limited to, in an FPGA. After then, the system divides the hash table into plural blocks. The number of the blocks is two or more.

In step 203, the system may divide each block into plural sub-blocks. The number of the sub-blocks is two or more.

In one embodiment of the present invention, the number of the sub-blocks is the same or different among the blocks. Alternatively, the number of the sub-blocks is the same among parts of the blocks and different among the remaining of the blocks.

Let us suppose that the length of a key is at most n bits, n being a positive integer, the length of a hash value is m bits, m being a positive integer, and $m \leq n$ in the following explanations.

In another embodiment of the present invention, the system divides each block into sub-blocks as follows: if n is divisible by m, the system may divide each block into d sub-blocks where d=n/m; and if n is not divisible by m, the system may divide each block into d sub-blocks where $d=\lceil n/m \rceil$ and $\lceil n/m \rceil$ is the smallest integer greater than or equal to n/m.

Each sub-block can store a key and, further, data associated with the key. The data is also called value, key value, or an entry associated with the key.

Each sub-block can store up to $2^m$ pieces of keys. Namely, each sub-block has memory slots $\{0, 1, \ldots, 2^m-1\}$.

In one embodiment of the present invention, if n is divisible by m, each sub-block stores $2^m$ pieces of keys, the hash values being different from each other; and if n is not divisible by m, $\lceil n/m \rceil-1$ among $\lceil n/m \rceil$ of the sub-blocks in a certain block store $2^m$ pieces of keys, the latter hash values being different from each other, and the remaining one sub-block stores $2^q$ pieces of keys, where q is the remainder when n is divided by m.

In one embodiment of the present invention, if n is divisible by m, each sub-block has memory slots numbered $\{0, 1, \ldots, 2^m-1\}$; and if n is not divisible by m, $\lceil n/m \rceil-1$ among $\lceil n/m \rceil$ of the sub-blocks in a certain block have memory slots numbered $\{0, 1, \ldots, 2^m-1\}$ and the remaining one sub-block has memory slots numbered $\{0, 1, \ldots, 2^q-1\}$, where q is the remainder when n is divided by m.

Hash functions used in the hash table made according to the process above are, for example, but not limited to, h: $\{0, 1\}^n \to \{0, 1\}^m$.

In one embodiment of the present invention, hash functions, $h_1(k), \ldots, h_d(k)$, of d sub-blocks of a certain block have at most only one key e which satisfies $h_1(e)=a_1, h_2(e)=a_2, \ldots, h_d(e)=a_d$, where $a_i$ (i=1, 2, \ldots, d) are integers ($0 \leq a_i \leq 2^m-1$).

In one embodiment of the present invention, if n is divisible by m, each hash function used by the sub-blocks can be defined as h: $\{0, 1\}^n \to \{0, 1\}^m$; and if n is not divisible by m, each hash function used by $\lceil n/m \rceil-1$ among $\lceil n/m \rceil$ of the sub-blocks in a certain block can be defined as h: $\{0, 1\}^n \rightarrow \{0, 1\}^m$, and the hash function used by the remaining one block can be defined as h: $\{0, 1\}^n \rightarrow \{0, 1\}^q$, where q is the remainder when n is divided by m.

In one embodiment of the present invention, each hash function calculates a bit of a hash value by an XOR operation of bits selected from a key e or by a selection of a bit from a key e. The details of the XOR operation will be explained by using FIGS. 8A and 8B and FIG. 9 mentioned below.

In one embodiment of the present invention, the hash functions belong to a universal family of universal hashing scheme.

In one embodiment of the present invention, if n is divisible by m, the rank of n×n matrix G is n when $g_{k,(j-1)m+p}$, an element of k-th row and (j−1)m+p-th column in G, is set to one if the k-th bit of the n-bit key is used for the XOR operation in the hash function used by j-th sub-block, in a specific order, of a certain block to calculate the p-th bit of the m-bit hash value, otherwise the element in G is set to zero; and if n is not divisible by m, the rank of n×n matrix G is n when $g_{k,p+l}$, an element of k-th row and p+l-th column in G, is set to one if the k-th bit of the n-bit key is used for the XOR operation in the hash function used by j-th sub-block, in a specific order, of a certain block to calculate p-th bit of the hash value, and if l=0 when j=1, otherwise $l=\Sigma_{i=1}^{j-1} m_i$, where $m_j=m$ or q that is the bit-length of the hash value generated by the hash function used by the j-th sub-block, and where q is the remainder when n is divided by m, otherwise the element in G is set to zero. The details of the rank of n×n matrix G will be explained by using FIGS. 8 and 9 mentioned below.

In one embodiment of the present invention, the system determines a pattern of association, used in a sub-block, between a key and a location for storing the key by a hash value obtained by calculation using a hash function.

Various types of hash tables made according to the process above are illustrated in FIGS. 3A and 3B, 4A and 4B, 5A and 5B, and 6A and 6B.

In one embodiment of the present invention, the computation of hash functions used in a block may be calculated as follows. The system prepares a hash function $h_j( )$ for each sub-block j of a block (j=1, 2, . . . , d). The hash functions $h_1, h_2 \ldots, h_d$ of the d sub-blocks of a certain block have at most only one key e which satisfies $h_1(e)=a_1$, $h_2(e)=a_2$, . . . , $h_d(e)=a_d$ where $a_i$ (i=1, 2, . . . , d) are integers ($0 \le a_i \le 2_m-1$). This is the uniqueness property of the hash functions. The hash functions can be implemented using only XOR gates. The 0-1 matrix corresponds to XOR operations of the hash functions. The 0-1 matrix of which rank is n, which means the matrix has full rank, guarantees the uniqueness property.

The following equation defines the calculation procedure of the d hash values $b_1, b_2, \ldots, b_d$ of an n-bit input key e where $b_j$ is the hash value generated by the hash function used in the sub-block j. If G contains an m×m identity matrix in the bottom m rows every consecutives m columns, the hash functions map sequential keys to sequential hash values.

$$e^T \oplus G = b_1, \ldots, b_d$$

e: n-bit input key;
$b_j$: m-bit hash value of the j-th sub-block;
G: full rank n×n 0-1 matrix for computing the hash functions of all sub-blocks.

The uniqueness property of the hash functions is guaranteed by the Chinese Remainder Theorem. If d number of co-prime integers $p_1, \ldots, p_d$ such that $\Pi_{i=1}^d p_i \ge 2^n$: the Chinese Remainder Theorem is represented as the following equation:

$$h_1(e) = e \bmod p_1$$
$$\ldots$$
$$h_d(e) = e \bmod p_d$$

In step 204, the system terminates the process for building a hash table.

Figure 3A:
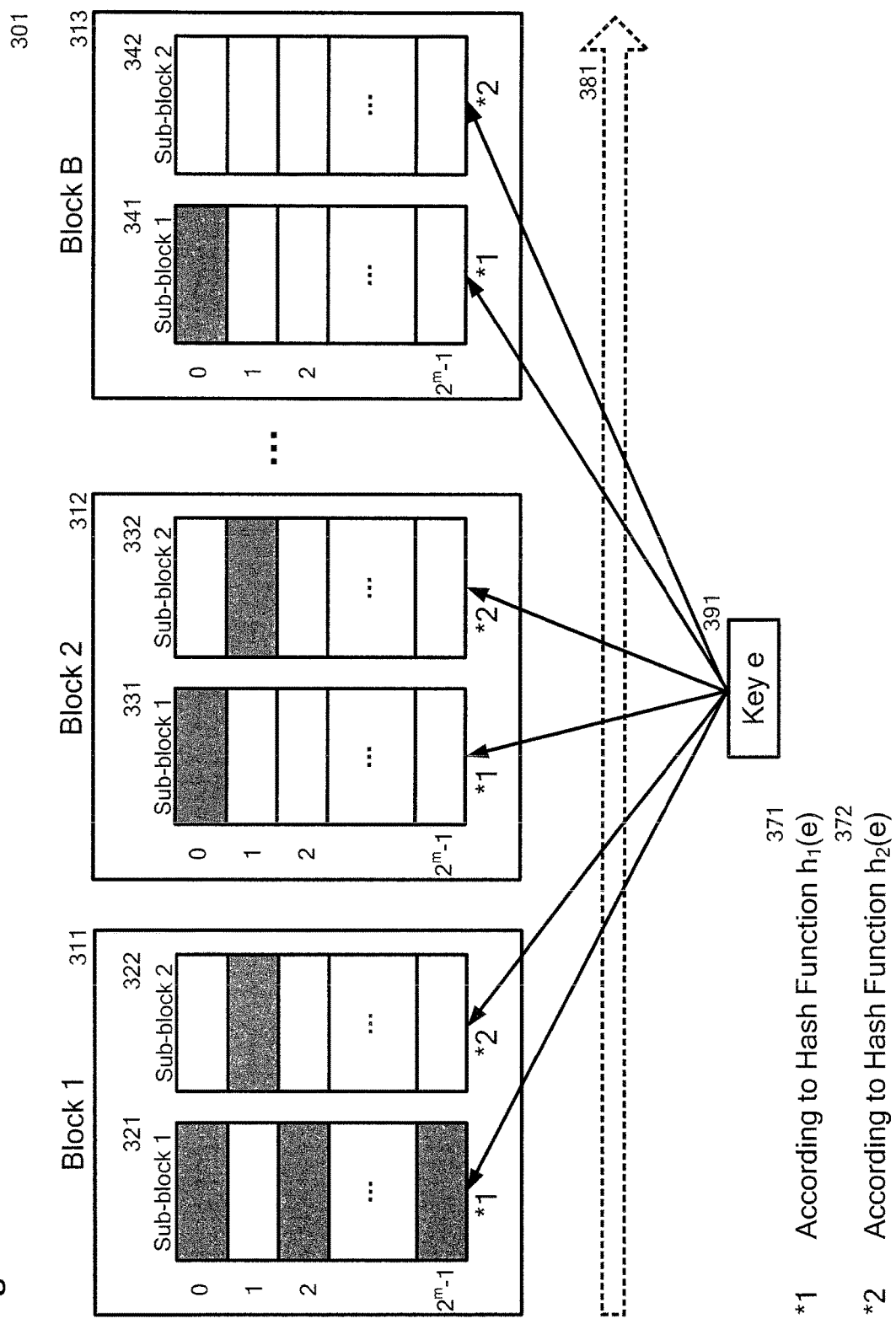
FIG. 3A illustrates one embodiment of a hash table built by the flowchart of the process described in FIG. 2.

With reference now to FIGS. 3A and 3B, FIGS. 3A and 3B illustrate one embodiment of a hash table built by the flowchart of the process described in FIG. 2 and one embodiment of a sub-block which belongs to a block in the hash table described in FIG. 3A.

FIG. 3A illustrates one embodiment of a hash table partitioned into B blocks each of which has two sub-blocks.

Hash table (301) has Block 1 (311), Block 2 (312), . . . , Block B (313). Block 1 (311) has Sub-block 1 (321) and Sub-block 2 (322). Block 2 (312) has Sub-block 1 (331) and Sub-block 2 (332). Block B (313) has Sub-block 1 (341) and Sub-block 2 (342). Accordingly, d=⌈n/m⌉ is two.

Key e (391) shows a key inserted into the hash table (301) according to one embodiment of the present invention. Key e (391) that is assigned in to the j-th sub-block is placed into the empty memory slot at $h_j(e)$.

Different hash functions, Hash Function $h_1(e)$ (371) and Hash Function $h_2(e)$ (372), may be used in each Block (311, 312 and 313).

Sub-block 1 (321), Sub-block 1 (331), and Sub-block 1 (341) utilize Hash Function $h_1(e)$ (371). Sub-block 2 (322), Sub-block 2 (332), and Sub-block 2 (342) utilize Hash Function $h_2(e)$ (372). Namely, different blocks can utilize the same hash function $h_j( )$ for their j-th sub-blocks.

FIG. 3A also illustrates the procedure of finding a leftmost empty slot by scanning the sub-blocks from left to right (381) when inserting a key e. In this finding procedure, the slots determined by the hash functions are examined whether the slot is empty or not. The details of the inserting of Key e will be explained by using FIGS. 10 and 13 mentioned below.

FIG. 3B illustrates one embodiment of Sub-block 1 (321) which belongs to Block 1 (311) in Hash Table (301).

Sub-block 1 (321) can store Key 0, Key 1, Key 2, . . . , Key 255. Further, Sub-block 1 (321) can store Data 0, Data 1, Data 2, . . . , Data 255, each of which data being associated with Key 0, Key 1, Key 2, . . . , Key 255, respectively.

Figure 4B:
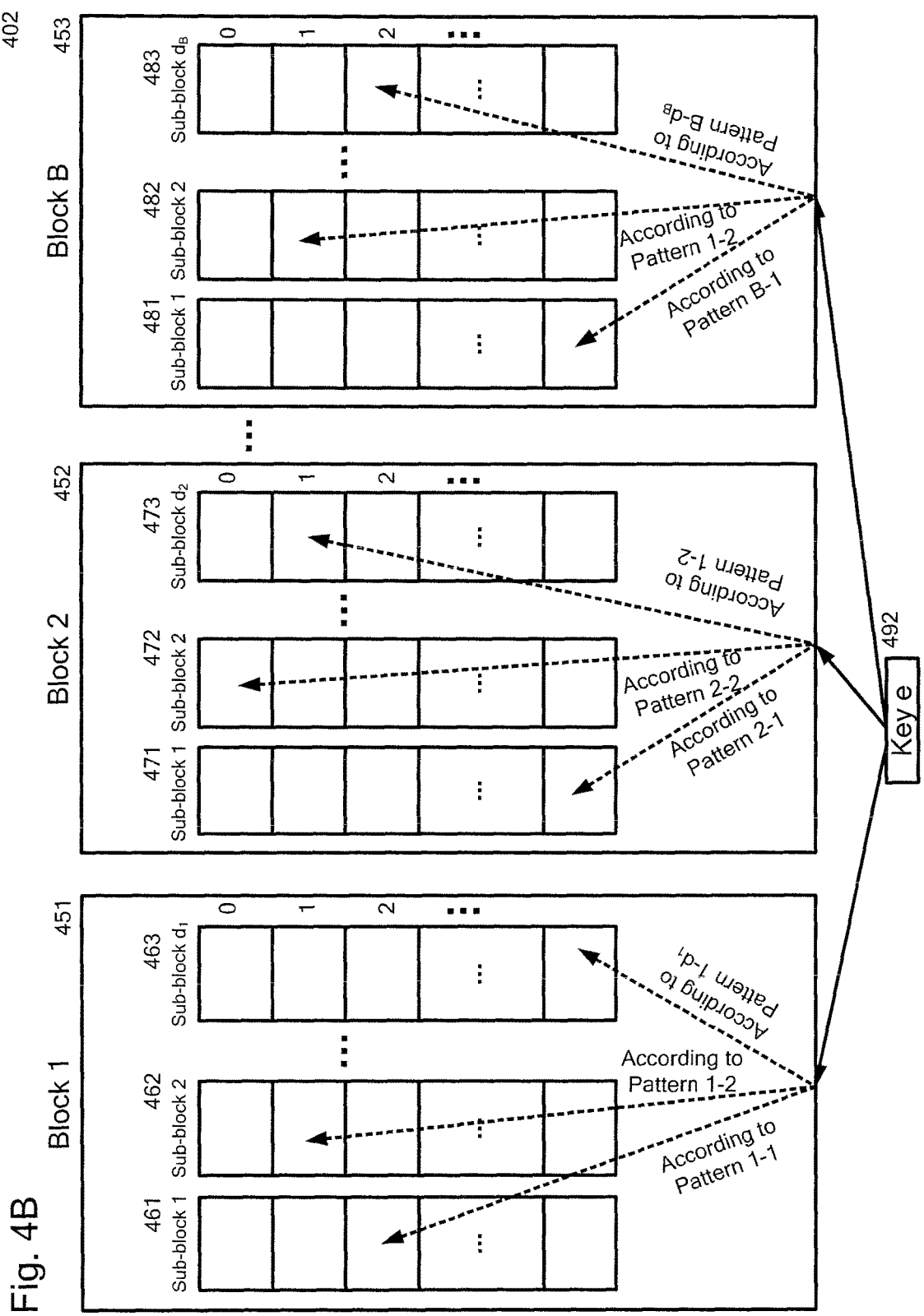

With reference now to FIGS. 4A and 4B, FIGS. 4A and 4B illustrate one embodiment of a hash table and plural mapping patterns used in sub-blocks.

FIG. 4A illustrates one embodiment of a hash table partitioned into B blocks. Block b has $d_b$ sub-blocks (b=1, 2, . . . , B) and mapping patterns of association between a key and a location for storing the key. Each sub-block uses a mapping pattern.

Hash table (401) has Block 1 (411), Block 2 (412), . . . , Block B (413). Block 1 (411) has Sub-block 1 (421), Sub-block 2 (422), . . . , and Sub-block $d_1$ (423). Block 2 (412) has Sub-block 1 (431), Sub-block 2 (432), . . . , and Sub-block $d_2$ (433). Block B (413) has Sub-block 1 (441), Sub-block 2 (442), . . . , and Sub-block $d_B$ (443).

Hash table (401) shows that Sub-block 1 (421), Sub-block 2 (422), and Sub-block $d_1$ (423), all of which belong to Block 1 (411), use Pattern 1-1, Pattern 1-2 and Pattern 1-$d_1$ of association between Key e (491) and a location for storing Key e (491), respectively. Each of the different Patterns 1-1, 1-2, and 1-$d_1$ points to a different slot in the Block 1 (411).

Similarly, Hash table (401) shows that Sub-block 1 (431), Sub-block 2 (432) and Sub-block $d_2$ (433), all of which belong to Block 2 (412), use Pattern 2-1, Pattern 2-2 and Pattern 2-$d_2$ of association between Key e (491) and a location for storing Key e (491), respectively. Each of the different Patterns 2-1, 2-2, and 2-$d_2$ points to a different slot in the Block 2 (412).

Similarly, Hash table (401) shows that Sub-block 1 (441), Sub-block 2 (442) and Sub-block $d_B$ (443), all of which belong to Block 3 (413), use Pattern B-1, Pattern B-2 and Pattern B-$d_B$ of association between Key e (491) and a location for storing Key e (491), respectively. Each of the different Patterns B-1, B-2, and B-$d_B$ points to a different slot in the Block B (413).

Accordingly, Hash table (401) shows that a first sub-block uses a first pattern of association between a key and a location for storing the key; a second sub-block which belongs to the same block comprising the first sub-block uses a second pattern which is different from the first pattern; and a third sub-block which belongs to the same block comprising the first and second sub-blocks uses a third pattern which is different from the first and the second patterns. Namely, Hash table (401) shows that each sub-block uses a different pattern of association between a key and a location for storing the key. Further, Hash table (401) shows that a certain sub-block uses a first pattern of association between a key and a location for storing the key, and another sub-block which belongs to the same block comprising the certain sub-block uses a second pattern which is different from the first pattern.

FIG. 4B illustrates one embodiment of a hash table partitioned into B blocks. Block b has $d_b$ sub-blocks (b=1, 2, . . . , B) and mapping patterns of association between a key and a location for storing the key. Each sub-block uses a mapping pattern.

Hash table (402) is the same as Hash table (401) described in FIG. 4A.

Hash table (402) shows that Sub-block 2 (462) in Block 1 (451) and Sub-block $d_2$ (473) in Block 2 (452) use the same Pattern 1-2 of association between Key e (492) and a location for storing Key e (492). Further, Hash table (402) shows that Sub-block 2 (462) in Block 1 (451) and Sub-block 2 (482) in Block B (453) use the same Pattern 1-2 of association between Key e (492) and a location for storing Key e (492).

The same hash function points to the same slot in certain sub-block in different blocks. Accordingly, the Pattern 1-2 points out the same slot in Sub-block 2 (462) in Block 1 (451), Sub-block 2 (472) in Block B (452), and Sub-block 2 (482) in Block B (453) to Key e (492). Hash table (402) shows that Pattern 1-2 points the slot number "1".

Accordingly, Hash table (402) shows that a pattern of association, used in a certain sub-block which belongs to a first block, between a key and a location for storing the key is the same with a pattern of association, used in a certain sub-block which belongs to a second block, between a key and a location for storing the latter key, Further, Hash table (402) shows that the same pattern of association between a key and a location for storing the key is used in the j-th sub-block which belongs to a first block and the k-th sub-block which belongs to a second block, where j and k are a positive integer and j is the same or different from k.

Hash table (402) also shows that the total number of a type of the patterns of association between a key and a location for storing the key is less than the number of all sub-blocks which belong to the hash table. For example, if a hash table has 10 blocks each having d sub-blocks, the total number of the sub-block is 10×d. Each sub-block uses a different pattern among one block, but the same pattern can be used among different blocks. Accordingly, if the same pattern can be used among different blocks, the total number of a type of patterns of association between a key and a location for storing the key is less than that of all sub-blocks which belong to the hash table.

Figure 5A:
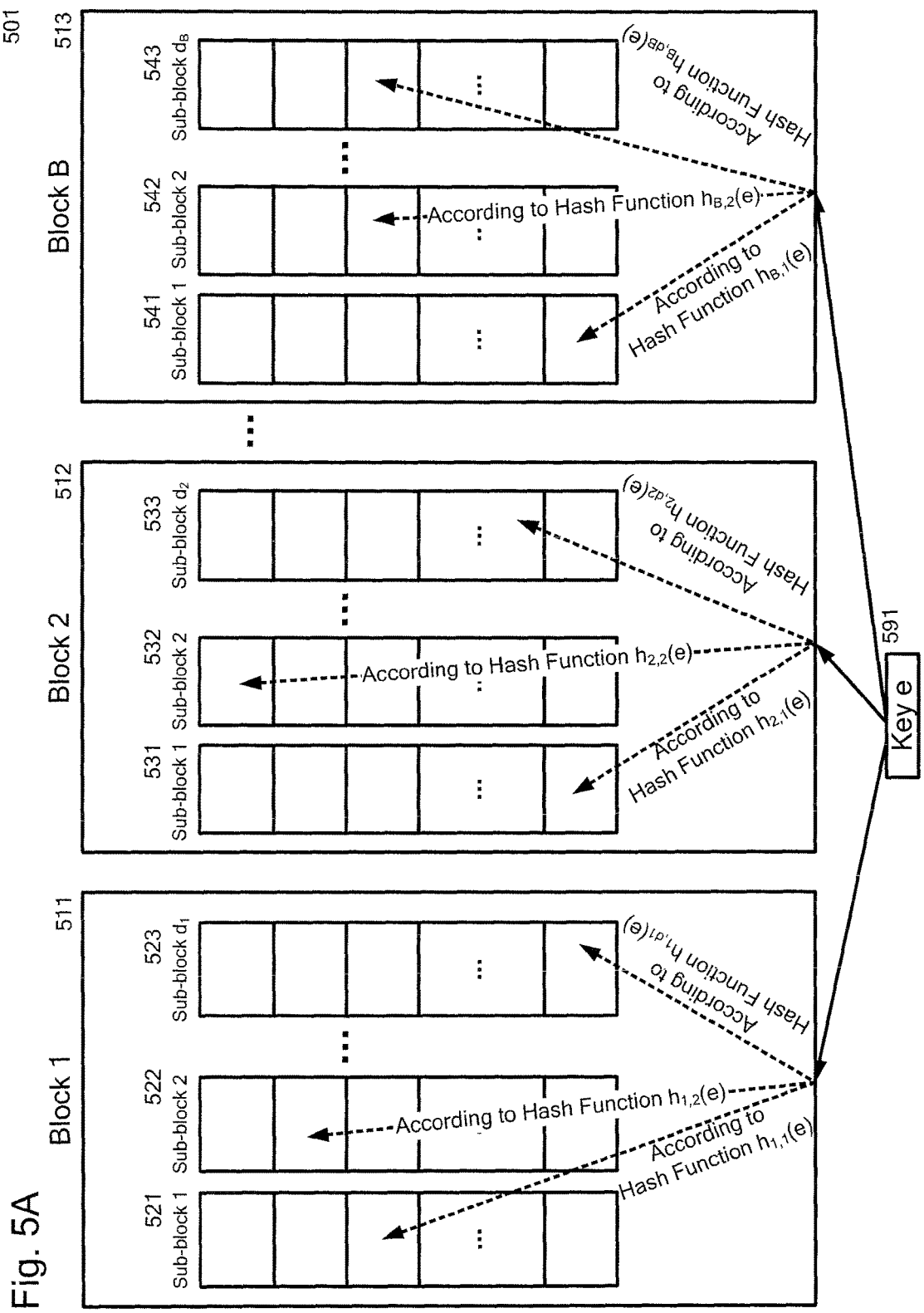

With reference now to FIGS. 5A and 5B, FIGS. 5A and 5B illustrate embodiments of hash tables and sub-blocks which use hash functions for determining a mapping pattern of association between a key and a location for storing the key.

FIG. 5A illustrates one embodiment of a hash table partitioned into B blocks. Block b has $d_b$ sub-blocks (b=1, 2, . . . , B) and hash functions used for determining a mapping pattern of association between a key of a sub-block and a location for storing the key.

Hash table (501) is the same as Hash table (401) described in FIG. 4A.

Hash table (501) shows that Hash Function $h_{1,1}(e)$, Hash Function $h_{1,2}(e)$, and Hash Function $h_{1,d1}(e)$ can be used for Sub-block 1 (521), Sub-block 2 (522), and Sub-block $d_1$ (523), all of which Sub-blocks belong to Block 1 (511), respectively, in order to determine a mapping pattern of association between Key e (591) of a sub-block and a location for storing Key e (591).

Similarly, Hash table (501) shows that Hash Function $h_{2,1}(e)$, Hash Function $h_{2,2}(e)$, and Hash Function $h_{2,d2}(e)$ can be used for Sub-block 1 (531), Sub-block 2 (532), and Sub-block $d_2$ (533), all of which Sub-blocks belong to Block 2 (512), respectively, in order to determine a mapping pattern of association between Key e (591) of a sub-block and a location for storing Key e (591).

Similarly, Hash table (501) shows that Hash Function $h_{B,1}(e)$, Hash Function $h_{B,2}(e)$, and Hash Function $h_{B,dB}(e)$ can be used for Sub-block 1 (541), Sub-block 2 (542), and Sub-block $d_B$ (543), all of which Sub-blocks belong to Block B (513), respectively, in order to determine a mapping pattern of association between Key e (591) of a sub-block and a location for storing Key e (591).

Accordingly, Hash table (501) shows that each hash function used in the sub-blocks is different from one another.

FIG. 5B illustrates one embodiment of a hash table partitioned into B blocks. Block b has $d_b$ sub-blocks (b=1, 2, . . . , B) and hash functions used for determining a mapping pattern of association between a key of a sub-block and a location for storing the key.

Hash table (502) is the same as Hash table (401) described in FIG. 4A.

Hash table (502) shows that Hash Function $h_1(e)$, Hash Function $h_2(e)$, and Hash Function $h_d(e)$ can be used for Sub-block 1 (561), Sub-block 2 (562) and Sub-block $d_1$ (563), all of which Sub-blocks belong to Block 1 (551), respectively, in order to determine a mapping pattern of association between Key e (592) of a sub-block and a location for storing Key e (592).

Similarly, Hash table (502) shows that Hash Function $h_1(e)$, Hash Function $h_2(e)$, and Hash Function $h_d(e)$ can be used for Sub-block 1 (571), Sub-block 2 (572) and Sub-block $d_2$ (573), all of which Sub-blocks belong to Block 2 (552), respectively, in order to determine a mapping pattern of association between Key e (592) of a sub-block and a location for storing Key e (592).

Similarly, Hash table (502) shows that Hash Function $h_1(e)$, Hash Function $h_2(e)$, and Hash Function $h_d(e)$ can be used for Sub-block 1 (581), Sub-block 2 (582) and Sub-block $d_B$ (583), all of which Sub-blocks belong to Block B (553), respectively, in order to determine a mapping pattern of association between Key e (592) of a sub-block and a location for storing Key e (592).

Accordingly, Hash table (502) shows that the same hash functions can be used among the different blocks. Namely, the same hash function is used in the j-th sub-blocks, in a specific order, of different blocks in the plural blocks.

Figure 6A:
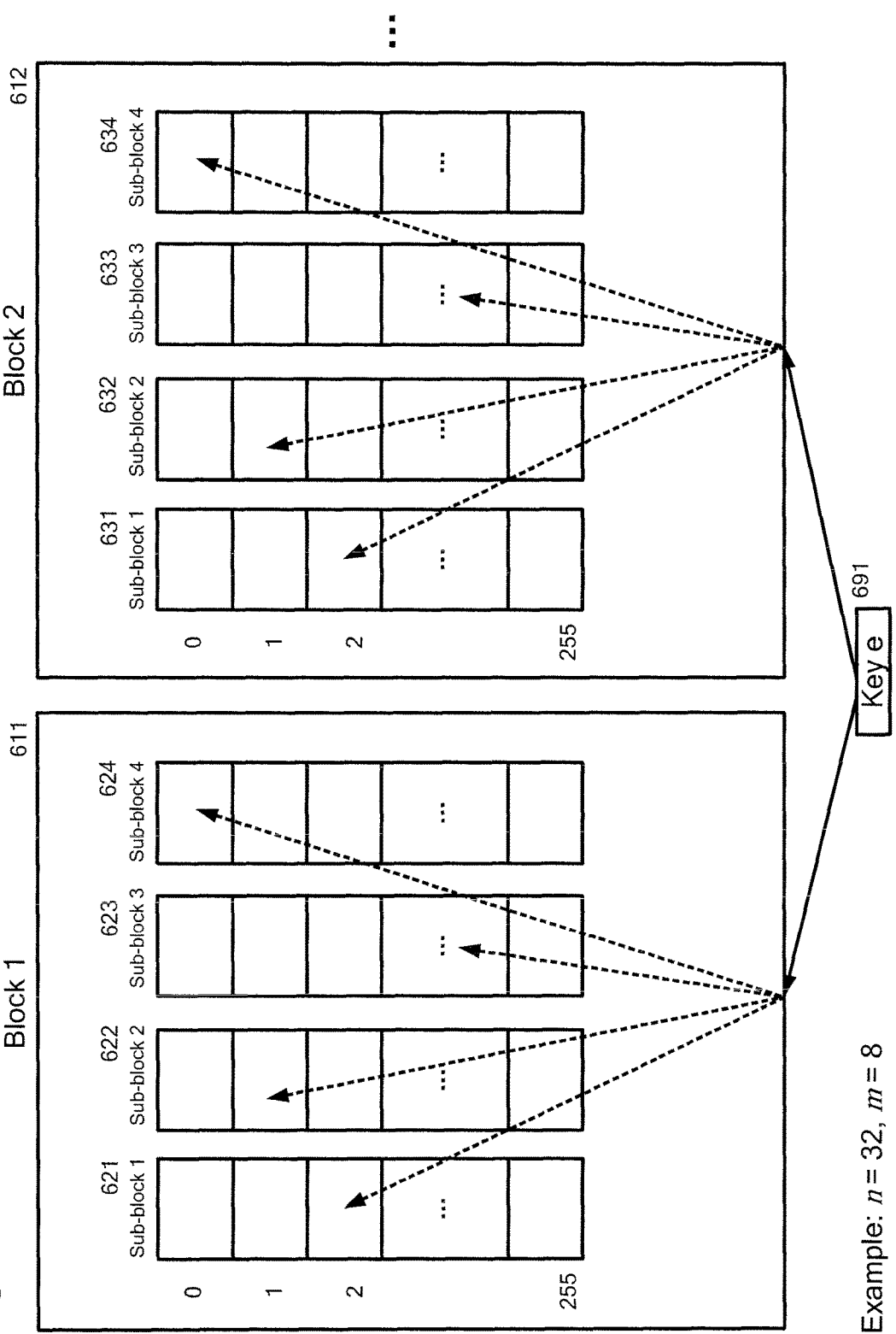
FIGS. 6A and 6B respectively illustrate one embodiment of hash tables built by the flowchart of the process described in FIG. 2 and the blocks that have the same number of sub-blocks.
Figure 6B:
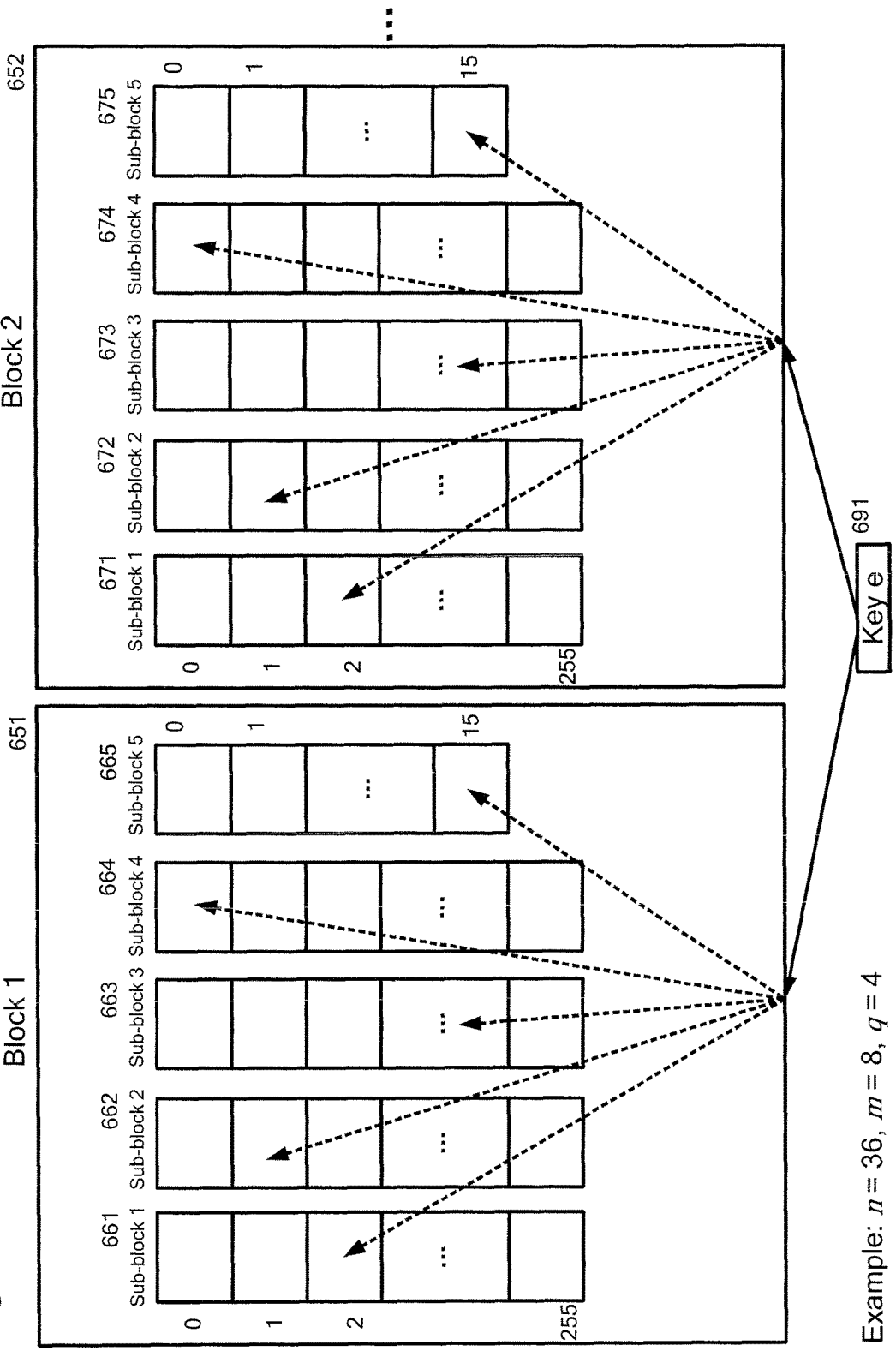

With reference now to FIGS. 6A and 6B, FIGS. 6A and 6B illustrate one embodiment of a hash table and the number of sub-blocks which belongs to each block is the same.

FIG. 6A illustrates the number of sub-blocks if the length of a key is divisible by the length of a hash value.

Let us suppose that the length of a key is 32 bits and the length of a hash value is 8 bits. Therefore, n=32 and m=8. n is divisible by m and, thus, d=n/m=4.

Accordingly, the system divides Block 1 (611) into 4 Sub-blocks 1 to 4 (621, 622, 623, and 624). Similarly, the system divides Block 2 (612) into 4 Sub-blocks 1 to 4 (631, 632, 633, and 634). The number of sub-blocks is the same among Block 1 (611) and Block 2 (612).

Each of Sub-blocks 1 to 4 (621, 622, 623, and 624) can store $2^m$, namely $2^8=256$, pieces of key, which hash values are different with each other. Similarly, each of Sub-blocks 1 to 4 (631, 632, 633, and 634) can store $2^8$ pieces of key, which hash values are different with each other.

Each of Sub-blocks 1 to 4 (621, 622, 623, and 624) has memory slots numbered $\{0, 1, \ldots, 2^m-1\}$, namely $\{0, 1, \ldots, 255\}$. Similarly, each of Sub-blocks 1 to 4 (631, 632, 633, and 634) has memory slots numbered $\{0, 1, \ldots, 2^m-1\}$, namely $\{0, 1, \ldots, 255\}$.

Each hash function used by each of Sub-blocks 1 to 4 (621, 622, 623, and 624) can be defined as h: $\{0, 1\}^n \rightarrow \{0, 1\}^m$, namely as h: $\{0, 1\}^{32} \rightarrow \{0, 1\}^8$. Similarly, Each hash function used by each of Sub-blocks 1 to 4 (631, 632, 633, and 634) can be defined as h: $\{0, 1\}^n \rightarrow \{0, 1\}^m$, namely as h: $\{0, 1\}^{32} \rightarrow \{0, 1\}^8$ The hash values of the keys held in each of Sub-blocks 1 to 4 (621, 622, 623. and 624) are ranged from 0 to 255. Similarly, the hash values of the keys held in each of Sub-blocks 1 to 4 (631, 632, 633, and 634) are ranged from 0 to 255.

FIG. 6B illustrates the number of sub-blocks if the length of a key is not divisible by the length of a hash value.

Let us suppose that the length of a key is 36 bits and the length of a hash value is 8 bits. Therefore, n=36, m=8. n is not divisible by m and, thus, d=⌈n/m⌉=5 (⌈x⌉ is the smallest integer greater than or equal to x) and q=4.

Accordingly, the system divides Block 1 (651) into 5 Sub-blocks 1 to 5 (661, 662, 663, 664, and 665). Similarly, the system divides Block 2 (652) into 5 Sub-blocks 1 to 5 (671, 672, 673, 674, and 675). The number of sub-blocks is the same among Block 1 (651) and Block 2 (652).

Each of Sub-blocks 1 to 4 (661, 662, 663, and 664) can store $2^m$, namely $2^8=256$, pieces of key and Sub-block 5 (665) which is the remaining one sub-block can store $2^q$, namely $2^4=16$, pieces of key. Similarly, each of Sub-blocks 1 to 4 (671, 672, 673, and 674) can store $2^8$ pieces of key and Sub-block 5 (675) which is the remaining one sub-block can store $2^4$ pieces of key.

Each of Sub-blocks 1 to 4 (661, 662, 663, and 664) has memory slots numbered $\{0, 1, \ldots, 2^m-1\}$, namely $\{0, 1, \ldots, 255\}$ and Sub-block 5 (665) which is the remaining one sub-block has memory slots numbered $\{0, 1, \ldots, 2^q-1\}$, namely $\{0, 1, \ldots, 15\}$. Similarly, each of Sub-blocks 1 to 4 (671, 672, 673, and 674) has memory slots numbered $\{0, 1, \ldots, 255\}$ and Sub-block 5 (675) which is the remaining one sub-block has memory slots numbered $\{0, 1, \ldots, 15\}$.

Each hash function used by each of Sub-blocks 1 to 4 (661, 662, 663, and 664) can be defined as h: $\{0, 1\}^n \rightarrow \{0, 1\}^m$, namely as h: $\{0, 1\}^{32} \rightarrow \{0, 1\}^8$, and Sub-block 5 (665) which is the remaining one sub-block can be defined as h: $\{0, 1\}^n \rightarrow \{0, 1\}^q$, namely as h: $\{0, 1\}^{32} \rightarrow \{0, 1\}^4$. Similarly, Each hash function used by each of Sub-blocks 1 to 4 (671, 672, 673, and 674) can be defined as h: $\{0, 1\}^n \rightarrow \{0, 1\}^m$, namely as h: $\{0, 1\}^{32} \rightarrow \{0, 1\}^8$, and Sub-block 5 (675) which is the remaining one sub-block can be defined as h: $\{0, 1\}^n \rightarrow \{0, 1\}^q$, namely as h: $\{0, 1\}^{32} \rightarrow \{0, 1\}^4$.

The hash values of the keys held in each of Sub-blocks 1 to 4 (661, 662, 663, and 664) are ranged from 0 to 255 and the hash values of the key held in Sub-block 5 (665) are ranged from 0 to 15. Similarly, the hash values of the keys held in each of Sub-blocks 1 to 4 (671, 672, 673 and 674) are range from 0 to 255 and the hash values of the key held in Sub-block 5 (675) are ranged from 0 to 15.

Figure 7A:
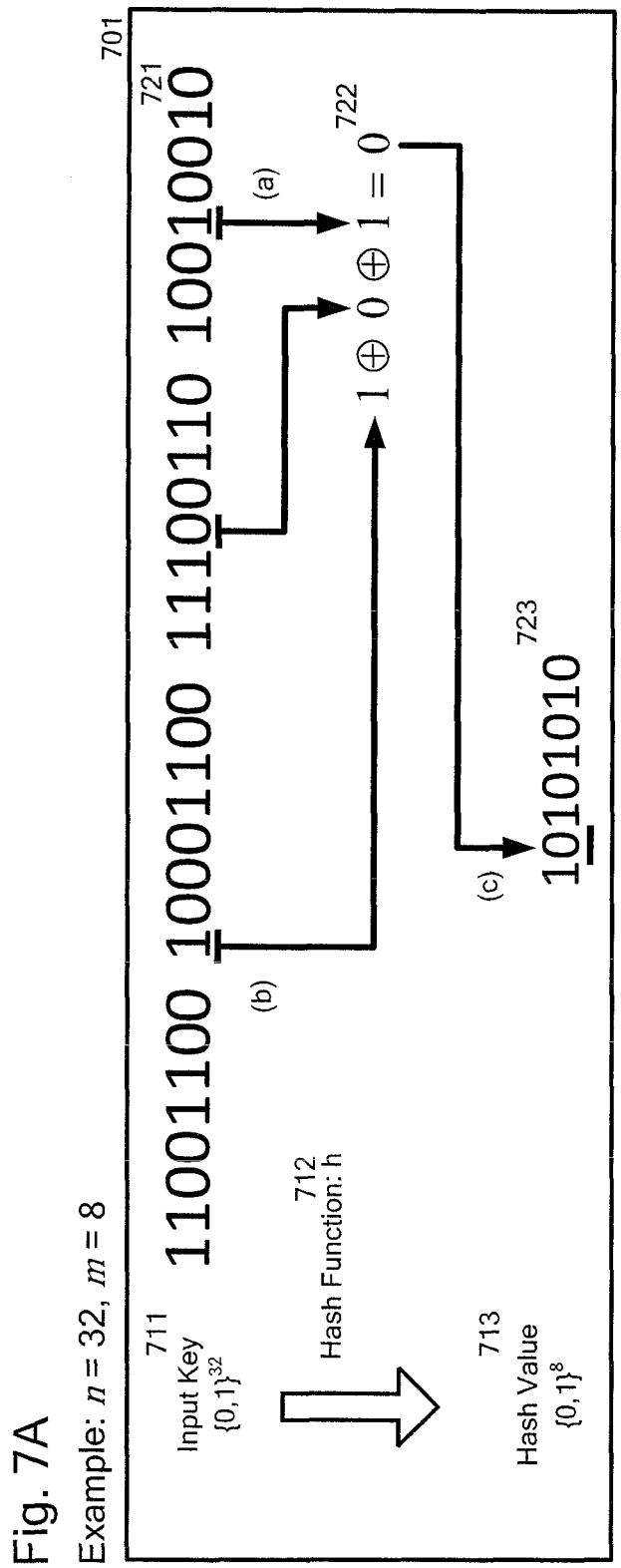

With reference now to FIGS. 7A and 7B, FIGS. 7A and 7B illustrate one embodiment of a hash value generated according to one embodiment of the present invention.

FIG. 7A illustrates a hash value generated from an input key under the situation that the length of the input key is divisible by the length of the hash value and a diagram for how to calculate the seventh bit among the 8 bits (a first bit to an eighth bit) of the hash value.

The diagram (701) in FIG. 7A shows an example of how to generate a hash value when the length of an input key (711) is 32 bits (n=32), $\{0, 1\}^{32}$, and the length of the hash value (713) is 8 bits, $\{0, 1\}^8$ (m=8) and, thus, n is divisible by m. A bit is selected from a predetermined position and a hash value is generated. The system determines beforehand, for example, using a random number sequence, how a bit is selected in step (a) and step (b) explained below.

In order to generate an 8-bit hash value (713), the system uses lower 8 bits (m) (the same as the number of bits of the hash value) and higher 24 bits (n−m) of an input key (711).

The system selects one bit present in a certain predetermined position among the lower 8 bits (m), as seen in step (a). FIG. 7A shows that a fifth bit (1) among the lower 8 bits (a first bit to an eighth bit) is selected.

The system selects one or a plurality of bits among higher 24 bits (n−m) in parallel to step (a) or before or after step (a), as seen in step (b). When selecting one or a plurality of bits present in certain predetermined positions among the higher 24 bits (n−m), as seen in step (b), the system may select a bit present in the same position among the higher 24 bits (n−m) a plurality of times. FIG. 7A shows that two bits, i.e., a sixteenth bit (1) and a fifth bit (0) among the higher 24 bits (a first bit to a twenty-fourth bit) are selected.

The system calculates exclusive OR of three bits of the bits 1 and 0 selected in step (b) and the bit 1 selected in step (a) and gets an exclusive ORed bit 0 (722).

The system assigns the exclusive ORed bit 0 to a bit in a certain predetermined position among the 8 bits of the hash value (713), as seen in step (c). FIG. 7A shows that the exclusive ORed bit (0) is assigned to a seventh bit among the 8 bits (a first bit to an eighth bit) of the hash value (see 723).

The system repeats steps (a), (b), and (c) until all the remaining 7 bits of the hash value (713) are assigned. However, in step (a), a bit once selected among the lower 8 bits (n) is not selected in the subsequent repeated steps. In repeated step (b), when selecting one or a plurality of bits present in certain predetermined positions among the higher 24 bits (n−m) through the repetition, the system can select a bit present in a position the same as a position once selected in the past (a position selected in preceding step (b)) and select a bit present in a position different from the position once selected in the past (i.e., a bit present in a position not selected yet).

The hash value (723) shows a hash value generated after the steps (a), (b), and (c) are repeated until all the remaining 7 bits of the hash value (713) are assigned.

The diagram (701) shows that the system receives the bit sequence (721) as an input key (711) and outputs the hash value (722) by using the hash function h (712).

FIG. 7B illustrates a hash value generated from an input key under the situation that the length of the input key is not divisible by the length of the hash value and a diagram for how to calculate the fourth bit or third bit among the 8 bits (a first bit to an eighth bit) of the hash value.

The upper diagram is an example of a hash function used in Sub-blocks (661 to 664 and 671 to 674 in FIG. 6B) and the lower diagram is an example of a hash function used in Sub-block (665 and 675 in FIG. 6B), when the length of an input value (key) is 36 bits (n=36), $\{0, 1\}^{36}$, the length of a hash value (743) is 8 bits (m=8), $\{0, 1\}^8$, and q=4 is the remainder when n is divided by m.

In the upper diagram (731), a bit is selected from a predetermined position and a hash value is generated. The system determines beforehand, for example, using a random number sequence, how a bit is selected in step (a) and step (b) explained below.

In order to generate an 8-bit hash value (743), the system uses lower 8 bits (m) of an input value (741).

The system selects one bit present in a certain predetermined position among the lower 8 bits, as seen in step (a). The upper diagram (731) shows that a third bit (0) among the lower 8 bits (a first bit to an eighth bit) is selected.

The system selects bits present in one or a plurality of different positions present in certain predetermined positions among higher 28 bits (n−m) in parallel to step (a) or before or after step (a), as seen in step (b). The upper diagram (731) shows that two bits, i.e., a sixteenth bit (1) and a fifth bit (0) among the higher 28 bits (a first bit to a twenty-eighth bit) are selected.

The system calculates exclusive OR of the bits 1, and 0 selected in step (b) and the bit 0 selected in step (a) and gets an exclusive ORed bit 1 (see 752).

The system assigns the exclusive ORed bit 1 in a certain predetermined position among the 8 bits of the hash value (743), as seen in step (c). The upper diagram (731) shows that the calculated value (1) is assigned to a fourth bit among the 8 bits (a first bit to an eighth bit) of the hash value (see 753).

The system repeats steps (a), (b), and (c) until all the remaining 7 bits of the hash value (743) are assigned. However, in step (a), a bit once selected among the lower 8 bits is not selected in the subsequent repeated steps. When repeating steps (a), (b), and (c) until all the remaining 7 bits of the hash value (743) are assigned, the system selects a bit present in a position different from a position once selected in the past (a position selected in preceding step (b)) (i.e., a bit present in a position not selected yet) through the repetition of step (b).

The upper diagram (731) shows that the system receives the bit sequence (751) as an input key and outputs the hash value (743) by using the hash function $h_1$ (742).

In the lower diagram (761), a bit is selected from a predetermined position and a hash value is generated. The system determines beforehand, for example, using a random number sequence, how a bit is selected in step (a) and step (b) explained below.

In order to generate a 4-bit hash value (773), the system uses upper 28 bits (n−q) of an input value (771).

The system selects bits present in one or a plurality of different positions present in certain predetermined positions among higher 28 bits (n−q), as seen in step (b). The lower diagram (761) shows that three bits, i.e., a twenty-first (0), ninth bit (0) and a first bit (0), among the higher 28 bits (a first bit to a twenty-eighth bit) are selected.

The system calculates exclusive OR of the bits 0, 0, and 0 selected in step (b) and gets an exclusive ORed bit 0 (see 782).

The system assigns the exclusive ORed bit 0 in a certain predetermined position among the 4 bits of the hash value (773), as seen in step (c). The lower diagram (761) shows that the calculated value (0) is stored in a third bit among the 4 bits (a first bit to a fourth bit) of the hash value (see 783).

The system repeats steps (b), and (c) until all the remaining 3 bits of the hash value (773) are assigned. When repeating steps (b), and (c) until all the remaining 3 bits of the hash value (773) are assigned, the system selects a bit present in a position different from a position once selected in the past (a position selected in preceding step (b)) (i.e., a bit present in a position not selected yet) through the repetition of step (b).

Figure 8B:
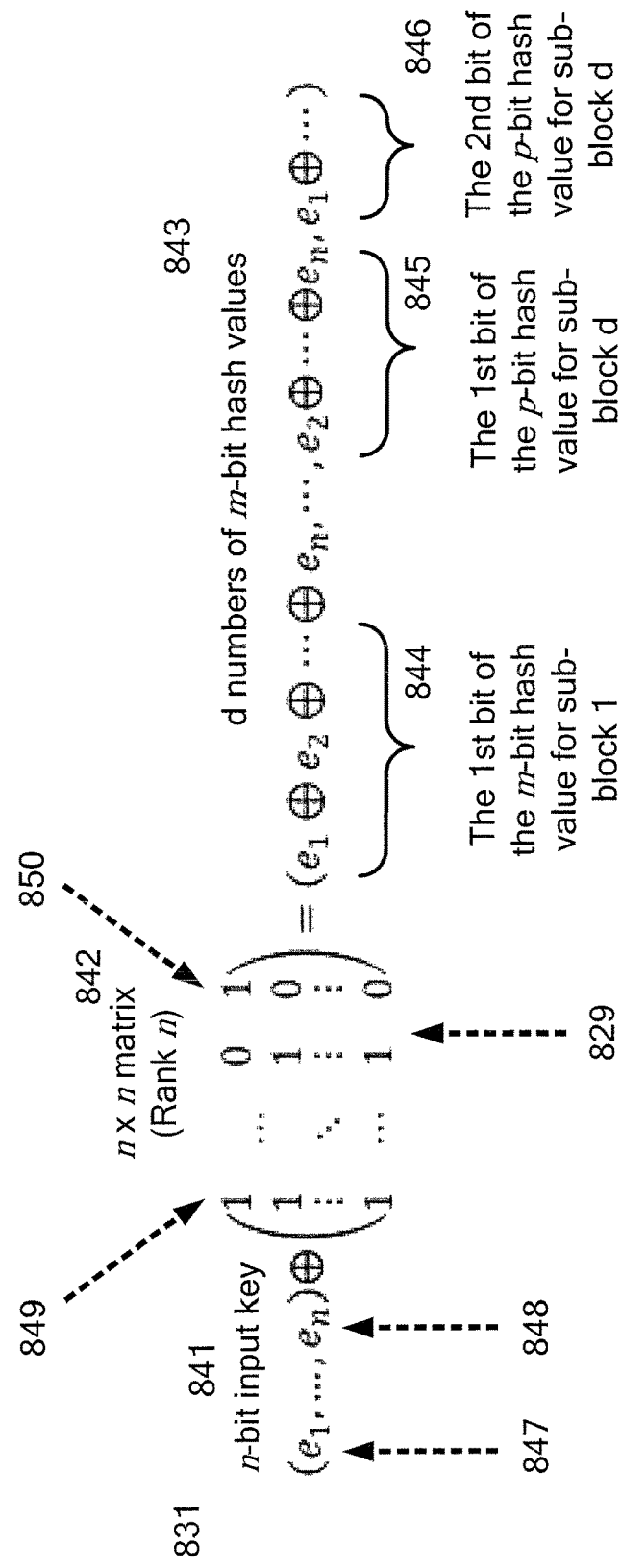

With reference now to FIGS. 8A and 8B, FIGS. 8A and 8B illustrate embodiments of a hash function which calculates a hash value by XOR operations of bits selected from key e.

The equation (801) shows an example of a hash-value calculation with XOR operations represented by 0-1 matrix G, when the length of the input key is 6 bits and the length of the hash value is 3 bits. The hash function represented by matrix G calculates the high first and second bits of the hash value by XOR operations of the bits selected from key e and the third bit of the hash value by the selection of the one bit from key e.

The equation (811) shows a 0-1 matrix corresponding to the XOR operation of a hush function, when n is divisible by m. The rank of n×n matrix G (822) is n when $g_{k,(j-1)m+p}$, an element of k-th row and (j−1)m+p-th column in G, is set to one if the k-th bit of the n-bit key (821) is used for the XOR operation in the hash function used by j-th sub-block, in a specific order, of a certain block to calculate the p-th bit of the m-bit hash value (823), otherwise the element in G is set to zero. For example, the XOR operation to calculate the 1st bit of the m-bit hash value for sub-block 1 (824) uses the 1st bit of the key (826) because the element of 1st row and 1st column in G (822) is 1 (828). Similarly, the XOR operation to calculate the last bit of the m-bit hash value for sub-block d (825) uses the last bit of the key (827) because the element of n-th row and n-th column in G (822) is 1 (829).

The equation (831) shows a 0-1 matrix corresponding to the XOR operation of a hush function for calculating a m-bit hash value (843) of an n-bit input key (841), when n is not divisible by m and q is the remainder when n is divided by m. The equation (803) is a case where q is 2. The rank of n×n matrix G (842) is n when $g_{k,p+l}$, an element of k-th row and p+l-th column in G, is set to one if the k-th bit of the n-bit key is used for the XOR operation in the hash function used by j-th sub-block, in a specific order, of a certain block to calculate p-th bit of the hash value, and if l=0 when j=1, otherwise $l=\Sigma_{i=1}^{j-1}$, where $m_j$=m or q that is the bit-length of the hash value generated by the hash function used by the j-th sub-block, and where q is the remainder when n is divided by m, otherwise the element in G is set to zero. For example, the XOR operation to calculate the 1st bit of the m-bit hash value for sub-block 1 (844) uses the 1st bit of the key (847) because the element of 1st row and 1st column in G (842) is 1 (849). Similarly, the XOR operation to calculate the 2nd bit of the p-bit hash value for sub-block d (846) uses the last bit of the key (848) because the element of 1st row and n-th column in G (822) is 1 (850).

Figure 9:
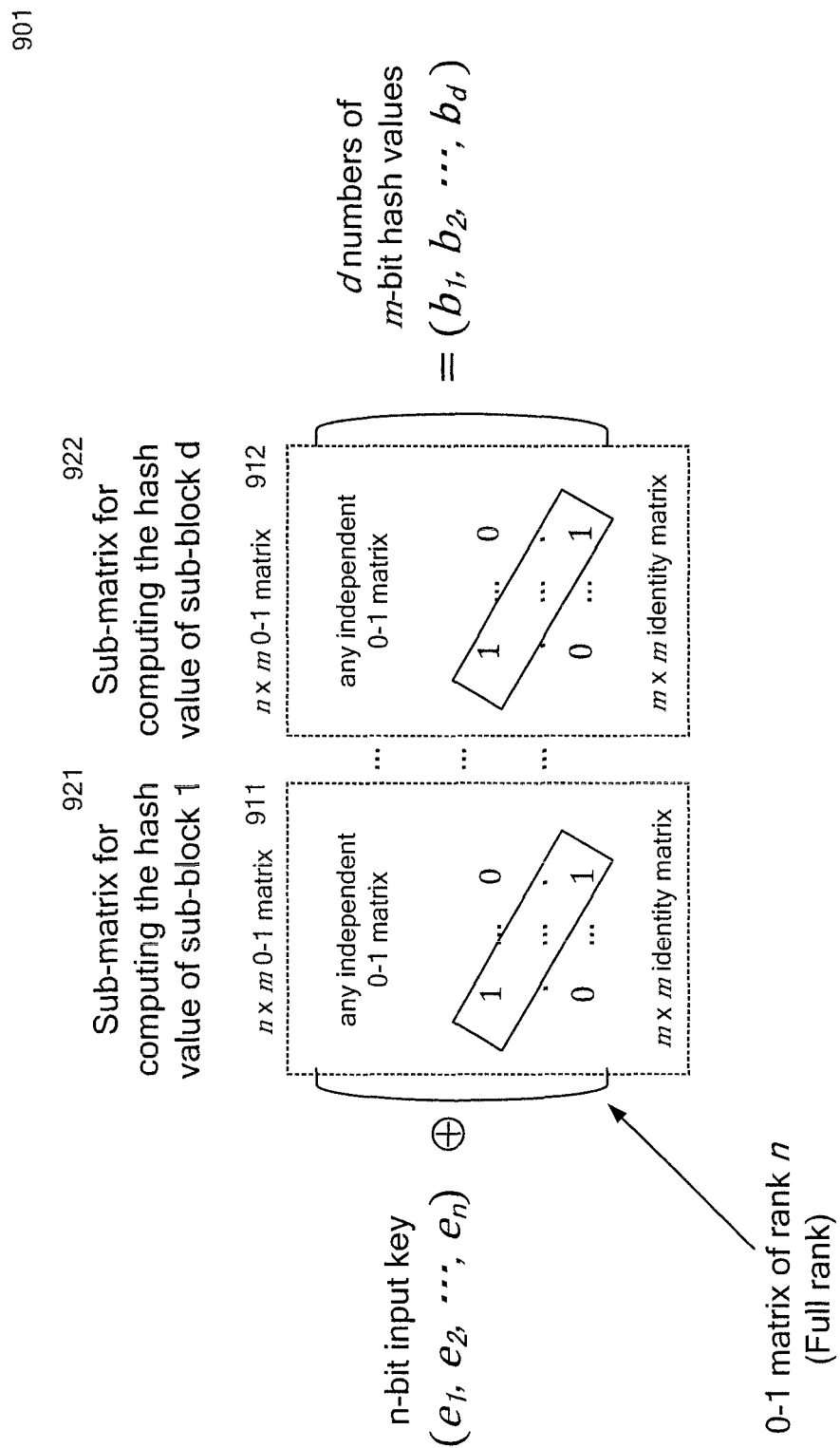
FIG. 9 illustrates one embodiment of 0-1 matrix of rank n.

With reference now to FIG. 9, FIG. 9 illustrates one embodiment of 0-1 matrix of rank n and illustrates a special case described in FIG. 8.

As described above, the n×n 0-1 matrix of which rank is n guarantees the uniqueness property. The equation (901) shows the 0-1 matrix used for calculating the hash values by using the n×m 0-1 sub-matrices (911, . . . , 912). The n×m 0-1 sub-matrix (911) corresponds for computing the hash value of sub-block 1 (921). The n×m 0-1 sub-matrix (912) corresponds for computing the hash value of sub-block 2 (922). When G contains an m×m identity matrix every consecutives m columns, the hash functions map sequential keys to sequential hash values.

Figure 11:
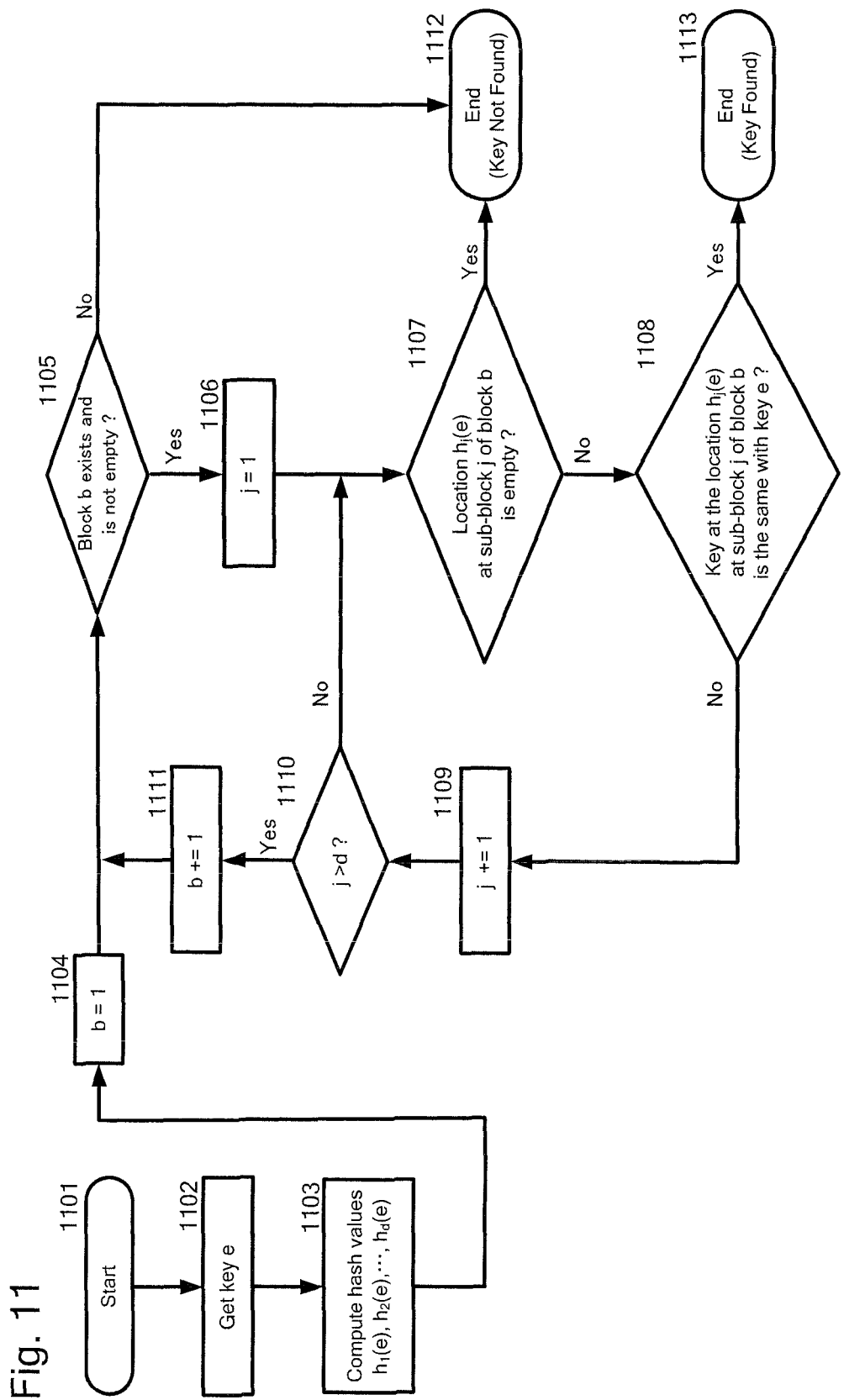
FIG. 11 illustrates one embodiment of a flowchart of a process for retrieving a key which exists in a position in a sub-block which belongs to a block.
Figure 12:
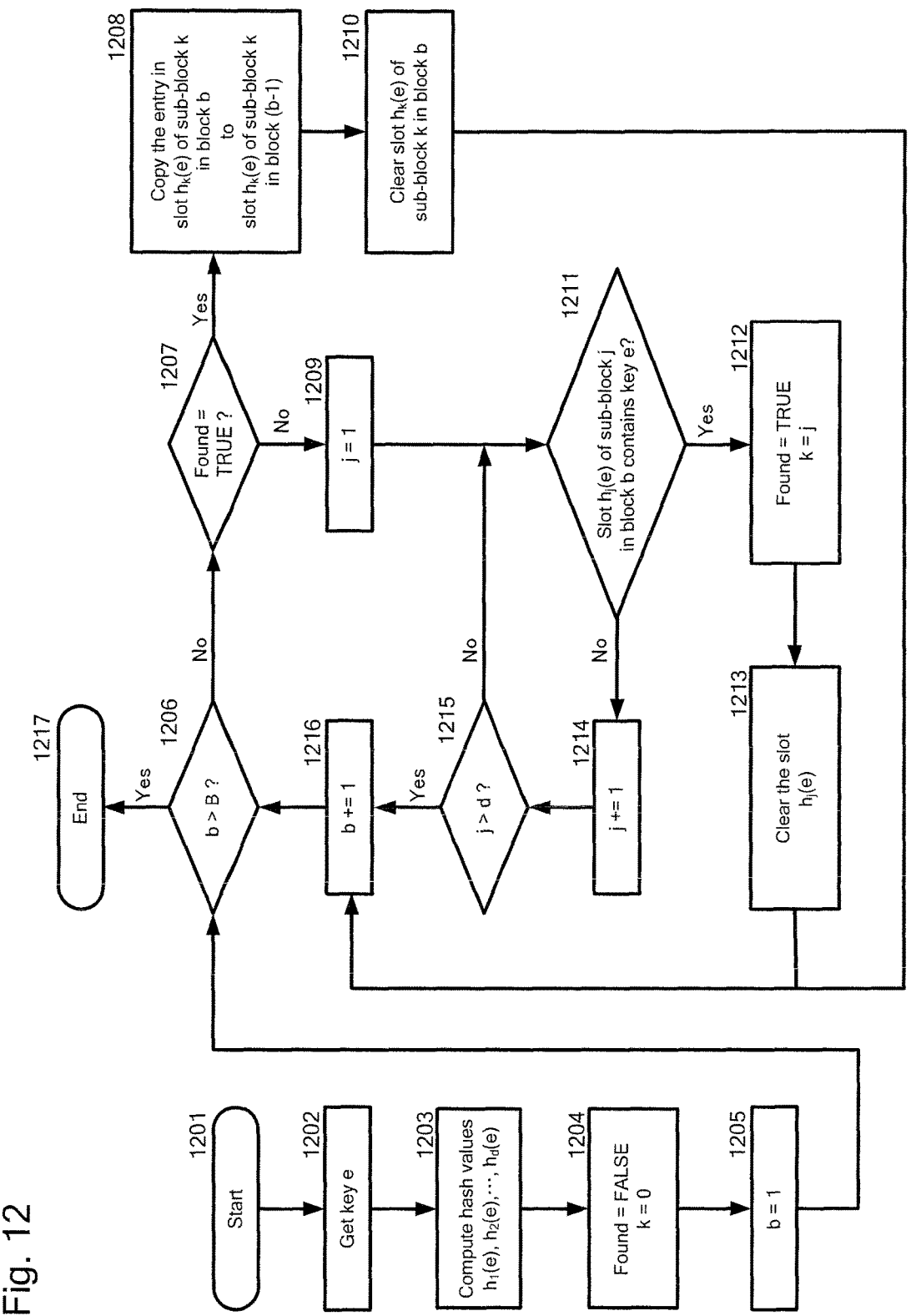
FIG. 12 illustrates one embodiment of a flowchart of a process for deleting a key which exists in a position in a sub-block which belongs to a block.

With reference now to FIGS. 10, 11 and 12, FIGS. 10, 11 and 12 illustrate a flowchart of a process for inserting, retrieving or deleting a key, respectively.

FIG. 10 illustrates one embodiment of a flowchart of a process for inserting a key into a position in a sub-block which belongs to a block, which process comprises determining, using a hash function, a position in the sub-block of an inserting key and inserting the key into the determined position. The insertion of the key may comprise selecting an empty memory slot of a sub-block, wherein the memory slot is determined by the hash function and putting the key into the slot. The selection of the empty memory slot and putting of the key may comprise, when there are plural sub-blocks having an empty memory slot, selecting a sub-block, based on a specific order, selecting the empty memory slot of the selected sub-block and putting the key into the slot.

In step 1001, the system starts a process for inserting a key.

In step 1002, the system gets a key e from, for example and not limited to, main memory, disk, SSD, or network.

In step 1003, the system computes hash values, $h_1(e)$, $h_2(e)$, . . . , $h_d(e)$ by using, for example and not limited to, a CPU, an FPGA, or an ASIC.

In step 1004, the system sets the index number of block as b=1.

In step 1005, the system judges whether Block b exists or not. If the judgment is negative, the system proceeds with a step 1006. If the judgment is positive, the system proceeds with a step 1007.

In step 1006, the system creates block b and its sub-block 1, d.

In step 1007, the system sets the index number of sub-block as j=1.

In step 1008, the system puts key e at the sub-block 1 of the block b at the location $h_1(e)$.

In step 1009, the system judges whether the location $h_j(e)$ at the sub-block j of the block b is empty or not. If the judgment is positive, the system proceeds with a step 1010. If the judgment is negative, the system proceeds with a step 1011.

In step 1010, the system puts key e at the sub-block j of the block b at the location $h_j(e)$.

In step 1011, the system increments the index number of the sub-block.

In step 1012, the system judges whether j>d. If the judgment is positive, the system proceeds with a step 1013. If the judgment is negative, the system returns to the step 1009.

In step 1013, the system increments the index number of the block and proceeds with the step 1005.

In step 1014, the system terminates the process after key e was inserted in the step 1008 or 1010.

In another embodiment of the present invention, the insertion procedure of a key e follows insert (e) as described below.

| Insert (e) |
| --- |
| 1   Compute hash values $h_1(e)$, $h_2(e)$, ..., $h_d(e)$ |
| 2   b=1 |
| 3   IF Block b exists |
| 4       j := 1 |
| 5       IF Location $h_j(e)$ at sub-block j of block b is EMPTY |
| 6           PUT key e at sub-block j of block b at location $h_j(e)$ |
| 7           END |
| 8       ELSE |
| 9           j := j + 1 |
| 10          IF j > d |
| 11              GOTO Line 5 |
| 12          ELSE |
| 13              b := b + 1 |
| 14              GOTO Line 3 |
| 15          ENDIF |
| 16      ENDIF |
| 17  ELSE |
| 18      Create block b and its sub-blocks 1, ..., d |
| 19      Put key e at sub-block 1 of block b at location $h_1(e)$ |
| 20      END |
| 22  ENDIF |

The code in line 1 corresponds to the step 1003. The code in line 2 corresponds to step 1006. The code in line 3 corresponds to the step 1007. The code in line 4 corresponds to the step 1009. The code in line 5 corresponds to the step 1011. The code in line 6 corresponds to the step 1012. The code in line 7 corresponds to the step 1016. The code in line 9 corresponds to the step 1013. The code in line 10 corresponds to the step 1014. The code in line 13 corresponds to the step 1015. The code in line 18 corresponds to the step 1008. The code in line 19 corresponds to the step 1010. The code in line 20 corresponds to the step 1016.

FIG. 11 illustrates one embodiment of a flowchart of a process for retrieving a key which exists in a position in a sub-block which belongs to a block, which process comprises determining, using a hash function, a possible position in the sub-block where there is possibility that a retrieving key is stored and retrieving the key which exists in the determined position. The retrieval of data may comprise determining whether the key stored in the memory slot determined by the hash function in the sub-block is the same with the retrieving key or not In step 1101, the system starts a process for retrieving a key.

In step 1102, the system gets a key e from, for example and not limited to, main memory, disk, SSD, or network.

In step 1103, the system computes hash values $h_1(e)$, $h_2(e)$, . . . , $h_d(e)$ by using, for example and not limited to, a CPU, an FPGA, or an ASIC.

In step 1104, the system sets the index number of block as b=1.

In step 1105, the system judges whether Block b exists and is not empty or not. If the judgment is negative, the system proceeds with a final step 1112. If the judgment is positive, the system proceeds with a step 1106.

In step 1106, the system sets the index number of sub-block as j=1.

In step 1107, the system judges whether the location $h_j(e)$ at the sub-block j of the block b is empty or not. If the judgment is positive, the system proceeds with the final step 1112. If the judgment is negative, the system proceeds with a step 1108.

In step 1108, the system judges whether a key at the location $h_j(e)$ at the sub-block j of the block b is the same with key e or not. If the judgment is positive, the system proceeds with the final step 1113. If the judgment is negative, the system proceeds with a step 1109.

In step 1109, the system increments the index number of sub-block.

In step 1110, the system judges whether j>d or not. If the judgment is positive, the system proceeds a step 1111. If the judgment is negative, the system returns to the step 1107.

In step 1111, the system increments the index number of block and repeats the steps 1105 to 1111.

In step 1112, the system terminates the process for retrieving a key with the result of key being not found.

In step 1113, the system terminates the process for retrieving a key with the result of key being found.

In another embodiment of the present invention, the retrieving procedure of a key e follows Retrieve (e) as described below.

| Retrieve (e) |
|---|
| 1  Compute hash values $h_1(e)$, $h_2(e)$, ..., $h_d(e)$ |
| 2  b=1 |
| 3  IF Block b is not empty |
| 4      j := 1 |
| 5      IF Location $h_j(e)$ at sub-block j of block b is EMPTY |
| 6          END // Key Not Found |
| 7      ELSE |
| 8          IF Key at the location $h_j(e)$ at sub-block j of block b is the same with key e |
| 9              END // Key Found |
| 10         ELSE |
| 11             j := j+ 1 |
| 12             IF j > d |
| 13                 b := b + 1 |
| 14                 GOTO Line 3 |
| 15             ELSE |
| 16                 GOTO Line 5 |
| 17             ENDIF |
| 18         ENDIF |
| 19     ENDIF |
| 20 ELSE |
| 21     END // Key Not Found |
| 22 ENDIF |

The code in line 1 corresponds to the step 1103. The code in line 2 corresponds to the step 1104. The code in line 3 corresponds to the step 1105. The code in line 4 corresponds to the step 1106. The code in line 5 corresponds to the step 1107. The code in line 6 corresponds to the step 1112. The code in line 8 corresponds to the step 1108. The code in line 9 corresponds to the step 1113. The code in line 11 corresponds to the step 1109. The code in line 12 corresponds to the step 1110. The code in line 13 corresponds to the step 1111. The code in line 21 corresponds to the step 1112.

FIG. 12 illustrates one embodiment of a flowchart of a process for deleting a key which exists in a position in a sub-block which belongs to a block, which process comprises determining, using a hash function, a possible position in the sub-block where there is possibility that a deleting key is stored and deleting the key which exists in the determined position. The deletion of the determined key comprises: retrieving a deleting key e in the hash table; and copying the element of a slot of a sub-block of which a specific order is the same with a sub-block where the deleting key was found and which the sub-block is in the current block b to the slot of a sub-block of which the specific order is the same with the sub-block where the deleting key was found and which the latter sub-block is in the block b-1 placed before the current block b.

In step 1201, the system starts a process for deleting a key.

In step 1202, the system gets a key e from, for example and not limited to, main memory, disk, SSD, or network.

In step 1203, the system computes hash values, $h_1(e)$, $h_2(e)$, ..., $h_d(e)$ by using, for example and not limited to, a CPU, an FPGA, or an ASIC.

In step 1204, the system allocates a flag for showing the retrieval of element e in the hash table is successful. Further, the system sets an index of sub-block representing the sub-block index that the key is found in as k=0.

In step 1205, the system sets the index number of block as b=1.

In step 1206, the system judges whether b>B or not. If the judgment is positive, the system proceeds with the final step 1216. If the judgment is negative, the system proceeds with a step 1207.

In step 1207, the system judges whether the retrieving key was found in the block examined before the current block b or not. If the judgment is positive, the system proceeds with a step 1208. If the judgment is negative, the system proceeds with a step 1209.

In step 1208, the system copies the entry in the slot $h_k(e)$ of the sub-block k in the block b to slot $h_k(e)$ of the sub-block k in the block b-1. The entry refers to data stored in a memory slot, the data being associated with a key. The process of the copy overwrites the entry in the slot $h_k(e)$ of the sub-block k in the block b-1.

In step 1209, the system sets the index number of the sub-block as j=1.

In step 1210, the system clears the slot $h_k(e)$ of the sub-block k in the block b.

In step 1211, the system judges whether the slot $h_j(e)$ of the sub-block j in the block b contains the key e or not. If the judgment is positive, the system proceeds with a step 1212. If the judgment is negative, the system proceeds with a step 1214.

In step 1212, the system changes the flag to TRUE in order to indicate that the retrieving key is found in the hash table. Further, the system sets index k that is the index of the sub-block where the retrieving key e is found in as k=j.

In step 1213, the system clears the slot $h_j(e)$ and, then, proceeds with step 1216.

In step 1214, the system increments the index number of sub-block.

In step 1215, the system judges whether j>d or not. If the judgment is positive, the system proceeds with a step 1216. If the judgment is negative, the system returns to the step 1211.

In step 1216, the system increments the index number of block. After then, the system proceeds with the step 1206.

In step 1217, the system terminates the process for deleting a key.

In another embodiment of the present invention, the deletion procedure of a key e follows Delete (e) as described below.

| Delete (e) |
|---|
| 1  compute $h_1(e)$, $h_2(e)$,..., $h_d(e)$ // computing hash functions |
| 2  Found := FALSE // a flag to indicate whether the retrieving key e is found in the hash table |

-continued

Delete (e)

```
 3    k := 0      // a variable to store the index of the
             sub-block where the key e was found
 4    b := 1
 5    IF b > B
 6        END
 7    ELSE
 8        IF Found = TRUE
 9            COPY the entry in slot h_k(e) of sub-block k in
      block b to slot h_k(e) of sub-block k in block (b−1) // *1 (see below)
10            GOTO Line 27
11        ELSE
12            j := 1
13            IF slot h_j(e) of sub-block j in block b contains key e
14                Found := TRUE // the retrieving is success
15                k := j    // store the index of
                  sub-block where the element e was retrieved
16                CLEAR the slot h_j(e)
17                GOTO Line 27
18            ELSE
19                j := j + 1
20                IF j > d
21                    GOTO Line 27
22                ELSE
23                    GOTO Line 13
24                ENDIF
25            ENDIF
26        ENDIF
27        b := b + 1
28        GOTO Line 5
29 ENDIF
```

*1: copying the element of the slot of the sub-block of which specific order is the same with the sub-block where the deleting key was found and which the sub-block is in the current block b to the slot of the sub-block of which the specific order is the same with the sub-block where the deleting key was found and which the latter sub-block is in the block b-1 placed before the current block b.

The code in line 1 corresponds to the step 1203. The code in line 2 and 3 correspond to the step 1204. The code in line 4 corresponds to the step 1205. The code in line 5 corresponds to the step 1206. The code in line 6 corresponds to the step 1216. The code in line 8 corresponds to the step 1207. The code in line 9 corresponds to the step 1208. The code in line 12 corresponds to the step 1209. The code in line 13 corresponds to the step 1210. The code in line 14 and 15 correspond to the step 1211. The code in line 16 corresponds to the step 1212. The code in line 19 corresponds to the step 1213. The code in line 20 corresponds to the step 1214. The code in line 27 corresponds to the step 1215.

Figure 13:
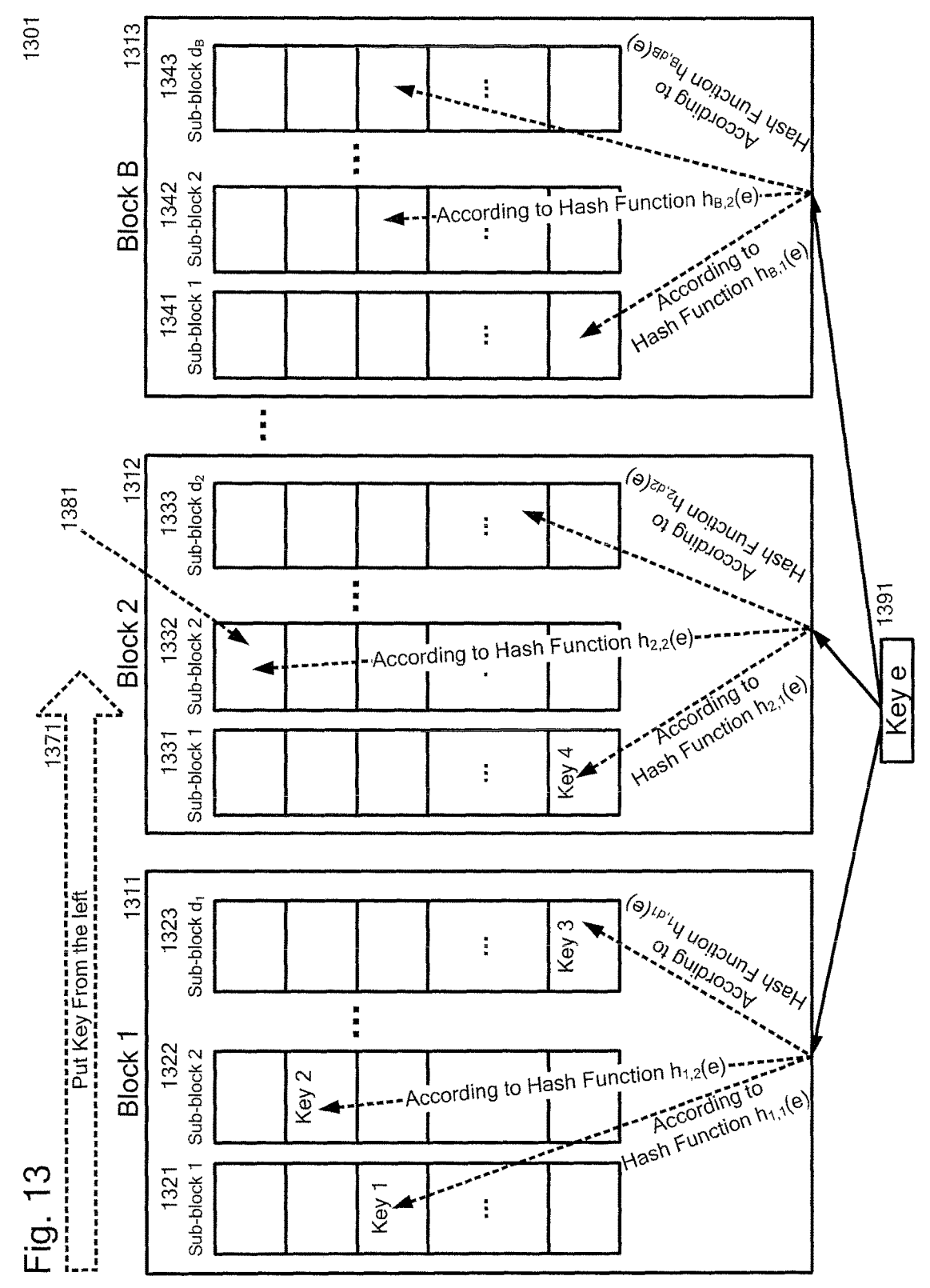

With reference now to FIG. 13, FIG. 13 illustrates one embodiment of a diagram for inserting a key into a position in a sub-block which belongs to a block.

Hash table (1301) is the same as Hash table (501) described in FIG. 5A. Further, Hash table (1301) shows that each hash function used in the sub-blocks is different from one another.

When the system inserts the key into a position in a sub-block, the system selects an empty memory slot of a sub-block. The memory slot is determined by the hash function and the system puts the key into the slot.

When there are plural sub-blocks having an empty memory slot, the system selects a sub-block, based on a specific order, selects a memory slot of the selected sub-block, and selects the empty memory slot of the selected sub-block and putting the key into the slot.

For example, the system scans each sub-block sequentially from the leftmost Block 1 (1311) to the rightmost Block B (1313) until the system finds an empty location, or creates a new empty block where e can be put.

In one embodiment of the present invention, the system searches for a location for putting a new key from the left to right, as seen in the bar (1371). The system puts the new key in the slot (1381) of Sub-block 2 (1332) which belongs to Block 2 (1312), because the slot (1381) is the leftmost empty slot.

Figure 14:
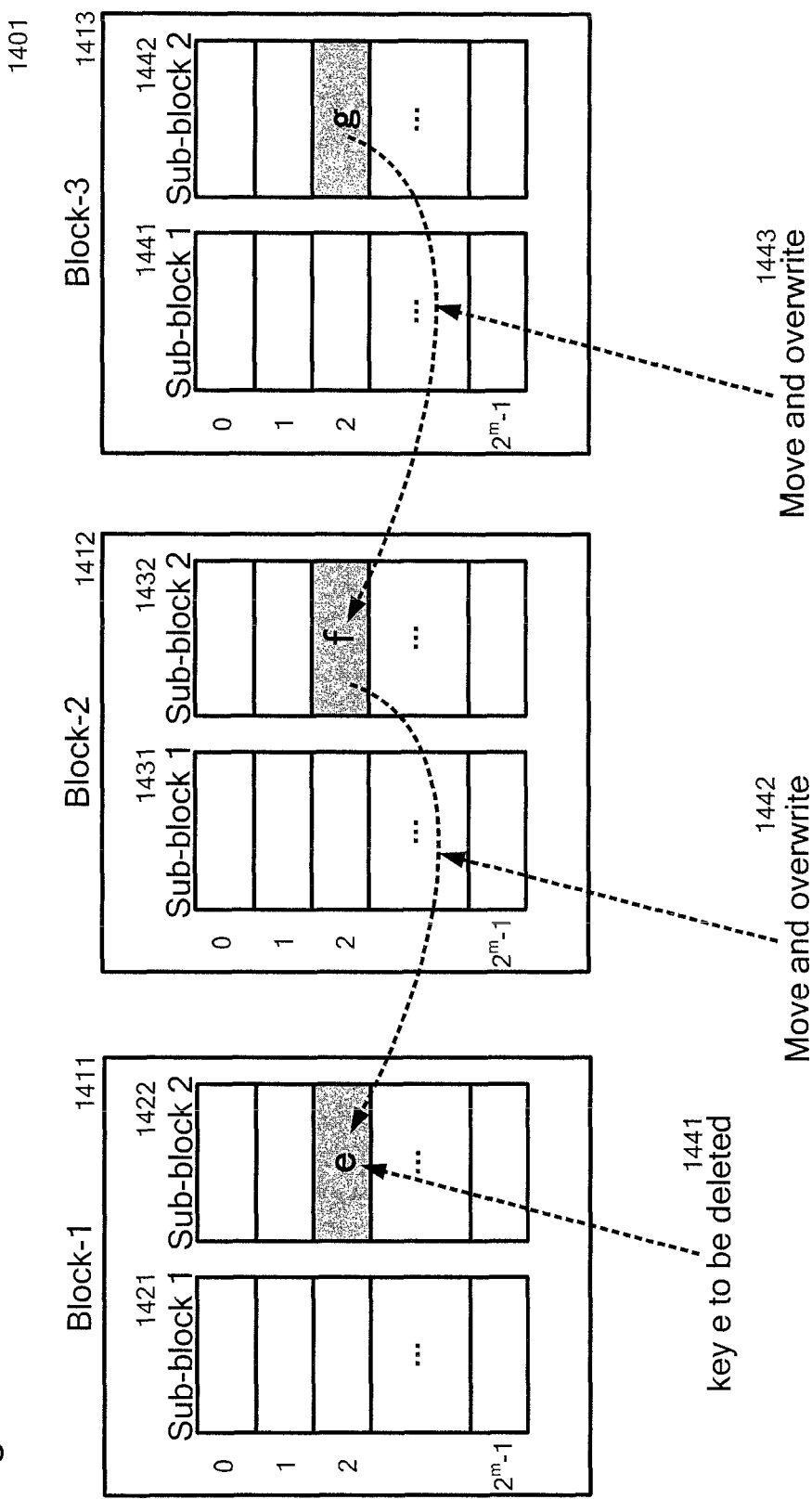
FIG. 14 illustrates one embodiment of a diagram for deleting a key from a position in a sub-block which belongs to a block.

With reference now to FIG. 14, FIG. 14 illustrates one embodiment of a diagram for deleting a key from a position in a sub-block which belongs to a block.

When the system deletes the key from the hash table, the system retrieves a deleting key e in the hash table, according to the flowchart described in FIG. 12, and copies the element of the slot of the sub-block of which specific order is the same with the sub-block where the deleting key was found and which the sub-block is in the current block b to the slot of the sub-block of which specific order is the same with the sub-block where the deleting key was found and which the latter sub-block is in the block b-1 placed before the current block b.

In one embodiment of the present invention, Hash table (1401) shows that a deletion of a key e (1441) can be done by overwriting it with entry that is located at the same slot of the same sub-block of the right blocks (1443, 1442). The system first overwrites the entry comprising the key e with the entry f in Sub-block 2 (1432) in Block-2 (1412). Then, the system overwrites the entry comprising the key f with the entry comprising key g.

The overwriting maintains the memory space-efficiency of the hash table according to one embodiment of the present invention.

Figure 15:
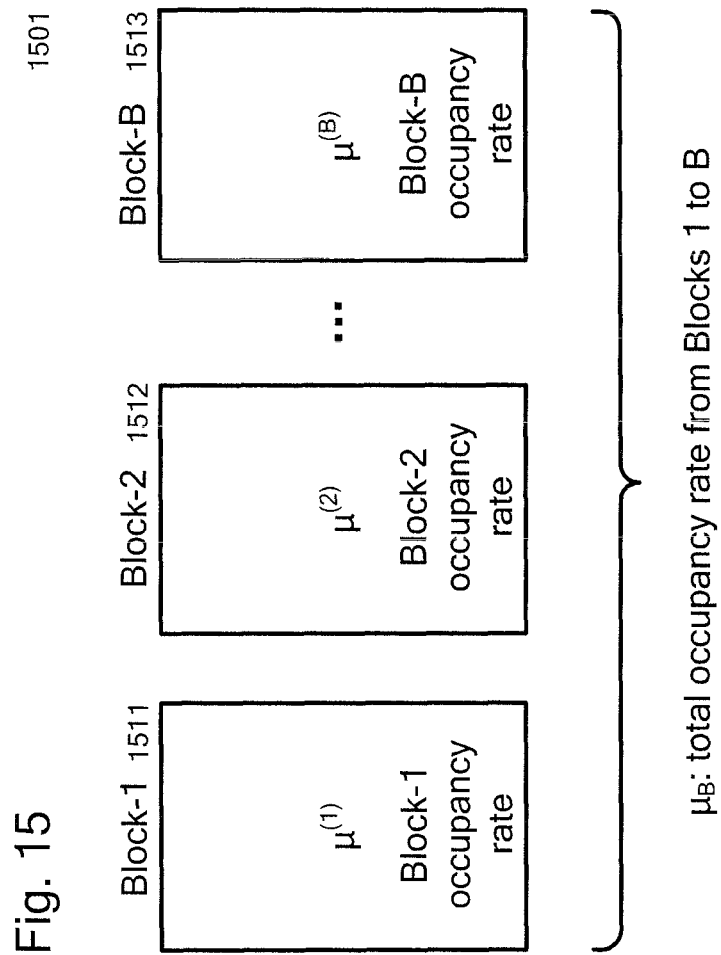
FIG. 15 illustrates one embodiment of a diagram of a memory space-efficiency according to one embodiment of the present invention.

With reference now to FIG. 15, FIG. 15 illustrates one embodiment of a diagram of a memory space-efficiency according to one embodiment of the present invention.

Hash Table (1501) according to one embodiment of the present invention has B Blocks (1511, 1512, and 1513). A memory space-efficiency, namely block occupancy rate in Block 1 (1511), Block 2 (1512), and Block B (1513) is represented $\mu^{(1)}$, $\mu^{(2)}$, ..., $\mu^{(3)}$, respectively. The total occupancy rate from Blocks 1 to B (1511, 1512 and 1513) is represented as $\mu_B$.

When N keys are inserted according to hash functions generated by one embodiment of the present invention and the number of memory blocks which is required for the N keys is B, the occupancy rate for an average case and worst case increases as the N increases, as described below.

The occupancy rate when using B blocks is defined as follows:

$$\mu_B = \frac{\text{\# keys inserted}}{\text{\# slots prepared}} = \frac{N}{Bd2^m},$$

where n means the bit-length of a key, n being a positive integer, m means the bit-length of hash values, m being a positive integer, and d=n/m The worst-case occupancy rate is defined as follows:

$$\mu_B \geq \frac{(d(B-1))^{\frac{1}{d-1}}}{2^m}$$

The average-case occupancy rate is defined as follows:

$$\mu_B \geq 1 - \frac{2^m \ln\ln d 2^m}{N \ln \phi_d} - \frac{\Theta(1) d 2^m}{N}$$

The proof of the worst-case occupancy rate is as follows.

Let us suppose that the keys are inserted according to one embodiment of the present invention. Let us suppose that B means the number of blocks required for hashing all the keys so far. Let us suppose that $\mu_B$ means the density of the hash table built according to one embodiment of the present invention, which is defined as the number of hashed keys divided by the size of the hash table, i.e., $$\mu_B = \frac{\sum_{b=1}^{B} n^{(b)}}{dB 2^m}$$

If inserting all keys according to one embodiment of the present invention requires B≥1 non-empty blocks, then it holds that $$\mu_B \geq \frac{(d(B-1))^{\frac{1}{d-1}}}{2^m}.$$

For the analysis purpose, the density of the block b by $$\mu^{(b)} = \frac{n^{(b)}}{d 2^m}.$$

$\mu^{(b)}$'s are non-increasing, i.e., $\mu^{(b)} \geq \mu^{(b+1)}$, since $n^{(b)} \geq n^{(b+1)}$. Let us suppose that bounding of the number of keys inserted at the block b, $n^{(b)}$.

For $n^{(b)} = \sum_{j=1}^{d} c_j^{(b)}$, the number of unique paths at block b, $p^{(b)}$, satisfies the following inequality.

$$p^{(b)} \geq c_d^{(b)} + \sum_{j=b+1}^{B} n^{(j)}, = c_d^{(b)} + \mu_{B-b}(B-b) d 2^m$$

The last equality is due to the fact that inserting all keys at the block (b+1) up to block B in the same order of their appearance will result in the same configuration as if inserting them at the block 1 up to the block (B−b).

On the other hand, the number of paths $p^{(b)}$ is bounded from above as follows.

$$p^{(b)} \leq \prod_{j=1}^{d} c_j^{(b)}$$

From the above equations, it follows that $$\prod_{j=1}^{d} c_j^{(b)} \geq c_d^{(b)} + \mu_{B-b}(B-b) d 2^m \geq \mu_{B-b}(B-b) d 2^m$$

By Jensen's inequality, we have the lower bound on the number of keys inserted at the block b as follows.

$$n^{(b)} = \sum_{j=1}^{d} c_j^{(b)} \geq d \left( \prod_{j=1}^{d} c_j^{(b)} \right)^{\frac{1}{d}} \geq d(\mu_{B-b}(B-b) d 2^m)^{\frac{1}{d}}$$

Therefore, the following equation is obtained.

$$\mu^{(b)} = \frac{n^{(b)}}{d 2^m} \geq \frac{(\mu_{B-b}(B-b) d 2^m)^{\frac{1}{d}}}{2^m}$$

By the non-increasing properties of μ(b)'s, the following inequality holds.

$$\mu_B \geq \frac{b}{B}\mu^{(b)} + \left(1 - \frac{b}{B}\right)\mu_{B-b}$$

Multiplying both sides by B and by rearranging the terms, we obtain the following inequality for all b=1, . . . , B−1.

$$B\mu_B - (B-b)\mu_{B-b} \geq b\mu^{(b)} \geq b\frac{((B-b)\mu_{B-b} d 2^m)^{\frac{1}{d}}}{2^m}$$

Denoting $g(B) = B\mu_B$ for ease of explanation, the recursive formula at the above equation is observed.

$$g(B) - g(B-b) \geq b\frac{(g(B-b) d 2^m)^{\frac{1}{d}}}{2^m}$$

It can be proved by induction that $$g(b) = b\alpha \frac{(d(b-1))^{\frac{1}{d-1}}}{2^m}$$

for some α≥1 satisfies the above recursive equation.

The proof of the average-case occupancy rate is as follows.

Under random insertion of keys, the expected number of blocks after inserting N number of keys can be bounded straightforwardly by the bin-and-ball games. The hashing technique according to one embodiment of the present invention can be viewed as assigning N balls into $d 2^m$ bins where each ball is assigned to the least full bins out of d possible ones that are chosen independently at random.

Thus, the expected number of blocks follows directly from the expected number of balls in the fullest box. The known result was refined, and then Always-Go-Left algorithm was introduced. In Always-Go-Left, each of d bins is randomly selected from a group of bins, and the ball is then placed on the lowest bin. Namely, n bins are partitioned into d groups each of which has size n/d. For each group, a bin is then randomly selected, and the ball is then placed into the lowest-loaded bin. If there is a tie, the ball is always placed on the left bin. Here, $\phi_d$ are terms related to Fibonacci numbers such that $\phi_2 = 1.61$ . . . is the so-called golden ratio, $\phi_2 < \phi_3 < \phi_4 < \ldots \phi_d < 2$, where $\lim_{d \to \infty} \phi_d = 2$.

Let us suppose that m balls are allocated to n bins with Always-Go-Left by partitioning the bins into d groups and selecting a candidate bin from each group. Then the number of bins with load at least $$\frac{m}{n} + i + \gamma$$

is bounded above by $n \cdot \exp(-\phi_d^{d \cdot i})$ with high probability, where $\gamma$ is a constant.

It can be easily seen that the maximum number of balls with high probability is $$\frac{m}{n} + \frac{\ln \ln n}{d \cdot \ln \phi_d} + \Theta(1).$$

The above theorem can be restated using parameters in our setting: the number of balls is now the number of items or elements, N, the number of groups is d, and the total number of bins is now $d \cdot 2^m$. The maximum number of balls is then translated into the maximum number of blocks.

The number of blocks after sequentially placing N elements into the least full location out of d possible ones determined by the hash functions $h_1^{(\cdot)}, h_2^{(\cdot)}, \ldots, h_d^{(\cdot)}$ is at most $$\frac{N}{d \cdot 2^m} + \frac{\ln \ln d \cdot 2^m}{d \ln \phi_d} + \Theta(1)$$

with high probability.

It is now easy to derive the lower bound of the density of the proposed multilevel hashing since $$\mu_B = \frac{1}{d 2^m} \frac{1}{B}.$$

The following bound on the expected density of the hash tables of the proposed technique is obtained.

$$\mu_B \geq 1 - \frac{2^m \ln \ln d 2^m}{N \ln \phi_d} - \frac{\Theta(1) d 2^m}{N}$$

with high probability, where the absolute value of the sum of the last two terms is less than one. Clearly, the average density grows with N such that for sufficiently large $N > d 2^m$, where there is a constant average density.

Properties of the hash functions according to one embodiment of the present invention are as follows.

Under uniform key insertion, the average number of blocks is $$\frac{N}{d 2^m} + O\left(\frac{\ln \ln d 2^m}{d}\right).$$

Namely, the keys are almost uniformly distributed across all available blocks, Block 1 (1511), Block 2 (1512), and Block B (1513).

The insertion and deletion of the keys in the hash table according to one embodiment of the present invention can be performed efficiently.

The occupancy rate of a block is always better than that of its preceding blocks: $\mu^{(j)} \geq \mu^{(j-1)}$.

The deletion of a particular block (for example, of sequential keys) can be done without much affecting the occupancy rate.

Figure 16:
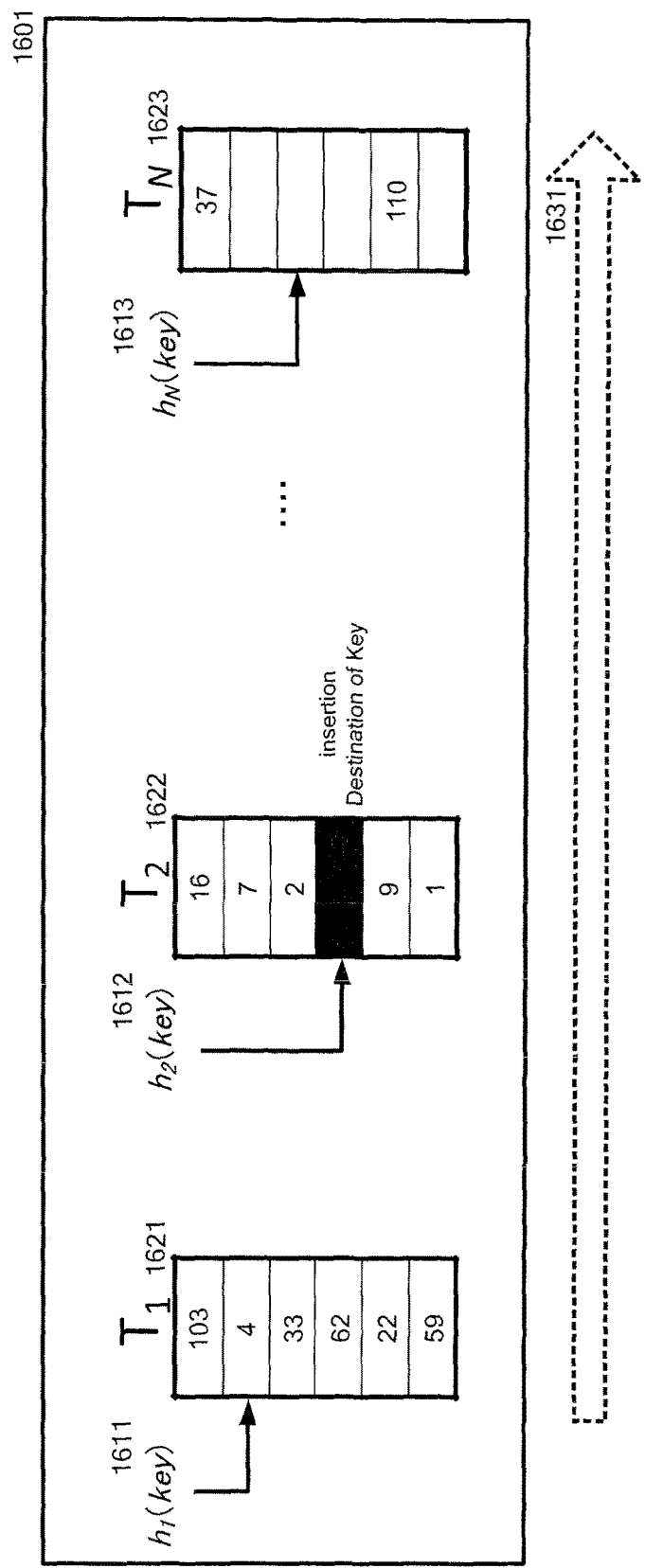
FIG. 16 illustrates a diagram of a conceptual diagram of the multi-level hash table (MHT).

With reference now to FIG. 16, FIG. 16 illustrates a diagram of a conceptual diagram of the multi-level hash table (MHT).

As shown in FIG. 16, in the MHT, a hash table (1601) is divided into N different hash tables $T_1$ to $T_N$ (1621, 1622, ..., 1623), N being a positive integer. In this example, each of the hash tables $T_1$ to $T_N$ (1621, 1622, ..., 1623) has a capacity of six. In the MHT, in each of the hash tables $T_1$ to $T_N$ (1621, 1622, ..., 1623), N different hash functions $h_1(\text{key})$ to $h_N(\text{key})$ (1611, 1612, ..., 1613) are prepared. In this way, in the MHT, different hash functions equivalent to the number of tables are necessary like $h_1(\text{key})$ to $h_N(\text{key})$.

The system calculates a hash value of a key (data desired to be added) using the different hash functions and inserts the key to the leftmost empty slot among the slots indicated by the hash functions of the hash tables $T_1$ to $T_N$ (1621, 1622, ..., 1623). In FIG. 16, the black slot is the destination of the key being inserted.

During retrieval of a key, the system retrieves equal keys from all slots indicated by the hash functions.

In the MHT, when there is no empty slot even in the hash table $T_N$ (1623), the MHT overflows. However, when N is sufficiently large, since most of the slots are occupied when the MHT overflows, space efficiency of the hash tables is high.

Figure 17:
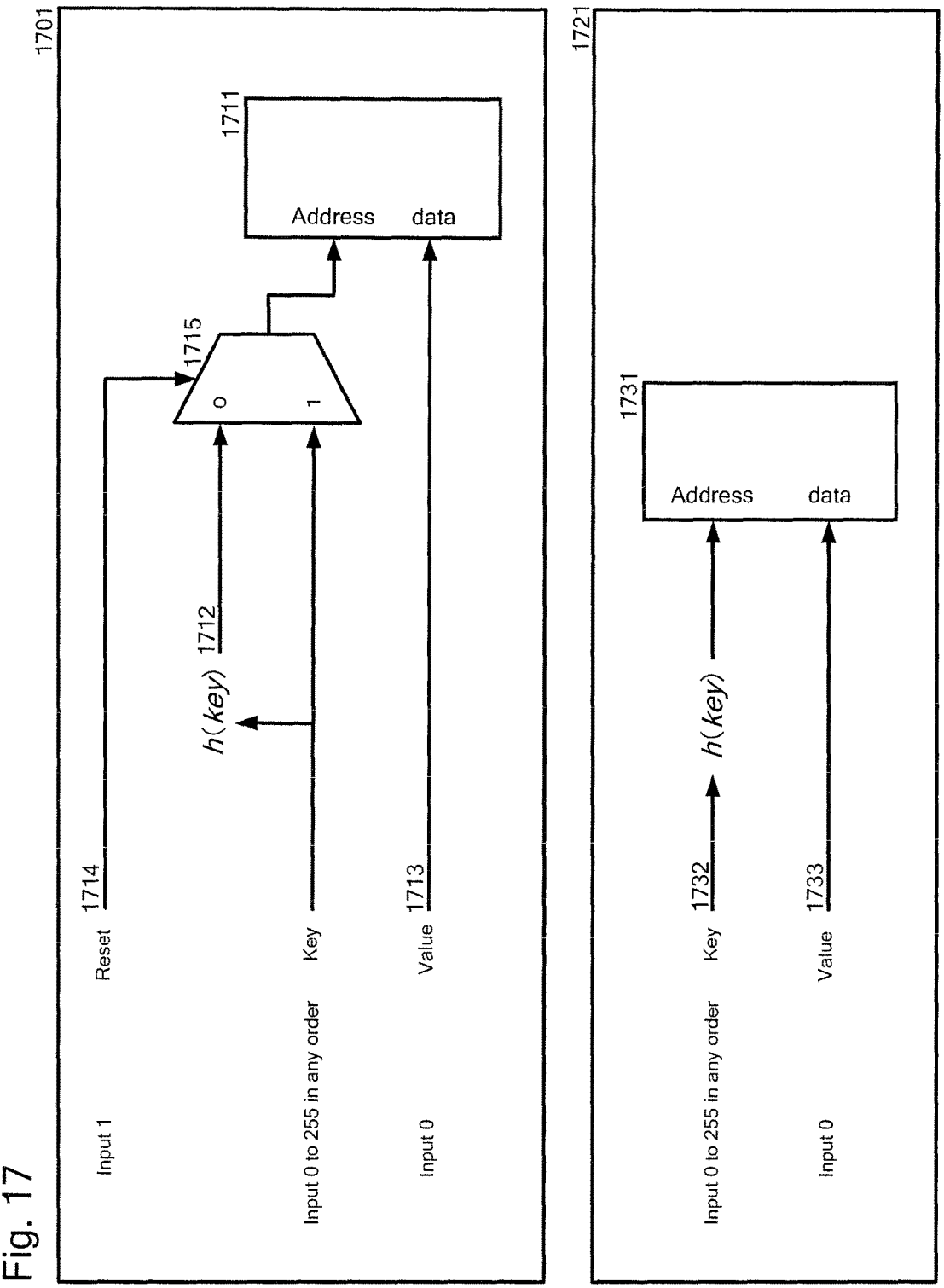
FIG. 17 illustrates a diagram in which a hash function generated according to the embodiment of the present invention uses, making use of the characteristic that all $2^N$ hash values appear, the hash values as memory addresses in zero-clearing or initializing a memory block.

With reference now to FIG. 17, FIG. 17 illustrates a diagram in which a hash function generated according to the embodiment of the present invention uses, making use of the characteristic that all $2^N$ hash values appear, the hash values as memory addresses in zero-clearing a memory block.

A diagram (1701) illustrated in the upper part of FIG. 17 shows a zero-clear circuit according to the related art. The capacity of the memory block (1711) is 256 entries. In the zero-clear circuit according to the related art, in order to reset the data stored in the memory block (1711) with zero (1713), a multiplexer (1715) for switching addresses (1712) generated by the hash function for normal operation and addresses for reset (0 to 255 input in any order) according to the reset (1714) signal is necessary. That is, in the zero-clear circuit according to the related art, an additional circuit for reset is necessary.

A diagram (1721) illustrated in the lower part of FIG. 17 shows an example in which data of a memory block (1731) is reset with zero using the hash value generated according to the embodiment of the present invention. When the data of the memory block (1731) is reset with zero (1733) using the hash value generated according to the embodiment of the present invention, the hash values can be directly used as memory addresses during reset operation (1721). This is because, according to the embodiment of the present invention, each of the hash functions outputs all $2^m$ hash values in response to the inputting $2^m$ keys $\{2^m a, 2^m a+1, 2^m a+2, \ldots, 2^m(a+1)-1\}$ to the hash function where a is a non-negative integer. For example, when inputting 256 integers ranged from 0 to 255 to an 8-bit hash function according to the one embodiment of the present invention, the hash function generates every integers ranged from 0 to 255 exactly once. Further, the keys do not need to be in a range of 0 to 255 and can appear in any order if the keys are {256a, 256a+1, 256a+2, . . . , 256a+255} where a is a non-negative integer. Therefore, the multiplexer (1715) illustrated in the upper part (1701) of FIG. 17 is unnecessary in the zero-clear circuit. That is, according to one embodiment of the present invention, the additional circuit for reset is unnecessary.

Figure 18:
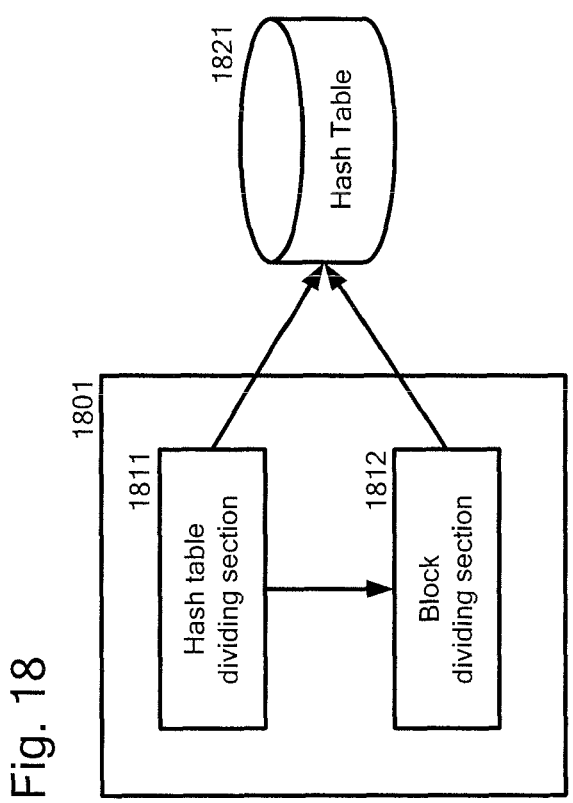
FIG. 18 illustrates one embodiment of an overall functional block diagram of a computer hardware used in one embodiment of the present invention.

With reference now to FIG. 18, FIG. 18 illustrates one embodiment of an overall functional block diagram of a computer hardware used in one embodiment of the present invention.

The system (1801) corresponds to the computer (101) described in FIG. 1.

The system comprises a hash table dividing section (1811) and a block dividing section (1812).

The hash table dividing section (1811) may prepare a hash table (1821) in, for example, but not limited to, an FPGA by using memory blocks and, then, divide the hash table into plural blocks.

The hash table dividing section (1811) may perform the step 202 of FIG. 2.

The block dividing section (1812) may divide each block into plural sub-blocks.

The block dividing section (1812) may perform the step 202 of FIG. 2.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A computer-implemented method for improving an efficiency of a computer processor by building a hash table having memory space efficiency and high throughput, the method comprising:
   dividing a hash table into plural blocks, the plural blocks including a set of memory slots configured to store hash keys and corresponding key values; and
   dividing each block into plural sub-blocks, each sub-block having a sub-set of the set of memory slots,
   wherein a certain sub-block uses a first pattern of association between a key and a location for storing the key, and another sub-block which belongs to the same block comprising the certain sub-block uses a second pattern which is different from the first pattern.

2. The method according to claim 1, wherein a pattern of association, used in a certain sub-block which belongs to a first block, between a key and a location for storing the key is the same with a pattern of association, used in a certain sub-block which belongs to a second block, between a key and a location for storing the latter key.

3. The method according to claim 1, wherein the number of a type of the patterns of association, used in a certain sub-block which belongs to a first or a second block, between a key and a location for storing the key is less than the number of all sub-blocks which belong to the hash table.

4. The method according to claim 1, wherein a pattern of association between a key and a location for storing the key is determined using a hash value obtained by calculation using a hash function.

5. The method according to claim 4, wherein the length of a key is at most n bits, n being a positive integer, the length of a hash value is m bits, m being a positive integer, and $m \leq n$;
   if n is divisible by m, each hash function used by the sub-blocks can be defined as h: $\{0,1\}^n \rightarrow \{0,1\}^m$; and
   if n is not divisible by m, each hash function used by $\lceil n/m \rceil - 1$ among $\lceil n/m \rceil$ of the sub-blocks in a certain block can be defined as h: $\{0,1\}^n \rightarrow \{0,1\}^m$, and the hash function used by the remaining one block can be defined as h: $\{0,1\}^n \rightarrow \{0,1\}^q$, where q is the remainder when n is divided by m.

6. The method according to claim 4, wherein the hash functions, $h_1, h_2, \ldots, h_d$ of the d sub-blocks of a certain block have at most only one key e which satisfies $h_1(e)=a_1$, $h_2(e)=a_2, \ldots, h_d(e)=a_d$, where $a_i$ (i=1, 2, ..., d) are integers $(0 \leq a_i \leq 2^m - 1)$.

7. The method according to claim 4, wherein each hash function calculates a bit of a hash value by an XOR operation of bits selected from a key e or by a selection of a bit from a key e.

8. The method according to claim 4, wherein the hash functions belong to a universal family of universal hashing scheme.

9. The method according to claim 4, the method further comprising each of the hash functions outputs all $2^m$ hash values in response to the inputting $2^m$ keys $\{2^m a, 2^m a+1, 2^m a+2, \ldots, 2^m(a+1)-1\}$ to the hash function where a is a non-negative integer.

10. The method according to claim 1, wherein the length of a key is at most n bits, n being a positive integer, the length of a hash value is m bits, m being a positive integer, and $m \leq n$;
   if n is divisible by m, the division of each block into plural sub-blocks comprises dividing each block into d sub-blocks where d=n/m; and
   if n is not divisible by m, the division of each block into plural sub-blocks comprises dividing each block into d sub-blocks where $d=\lceil n/m \rceil$ and $\lceil n/m \rceil$ is the smallest integer greater than or equal to n/m.

11. The method according to claim 1, wherein the length of a key is at most n bits, n being a positive integer, the length of a hash value is m bits, m being a positive integer, and $m \leq n$;
   if n is divisible by m, each sub-block stores $2^m$ pieces of keys, wherein hash values are different from each other; and
   if n is not divisible by m, $\lceil n/m \rceil - 1$ among $\lceil n/m \rceil$ of the sub-blocks in a certain block store $2^m$ pieces of keys, wherein hash values are different from each other, and the remaining one sub-block stores $2^q$ pieces of keys, where q is the remainder when n is divided by m.

12. The method according to claim 1, wherein the length of a key is at most ri bits, n being a positive integer, the length of a hash value is m bits, m being a positive integer, and $m \leq n$;
   if n is divisible by m, each sub-block has memory slots numbered $\{0, 1, \ldots, 2^m - 1\}$; and
   if n is not divisible by m, $\lceil n/m \rceil - 1$ among $\lceil n/m \rceil$ of the sub-blocks in a certain block have memory slots numbered $\{0, 1, \ldots, 2^m - 1\}$ and the remaining one sub-block has memory slots numbered $\{0, 1, \ldots, 2^q - 1\}$, where q is the remainder when n is divided by m.

13. The method according to claim 1, wherein the length of a key is at most n bits, n being a positive integer, the length of a hash value is m bits, m being a positive integer, and $m \leq n$;
   if n is divisible by m, the rank of n×n matrix G is n when $g_{k,(j-1)m+p}$, an element of k-th row and (j−1)m+p-th column in G, is set to one if the k-th bit of the n-bit key is used for the XOR operation in the hash function used by j-th sub-block, in a specific order, of a certain block to calculate the p-th bit of the m-bit hash value, otherwise the element in G is set to zero; and
   if n is not divisible by m, the rank of n×n matrix G is n when $g_{k,p+l}$, an element of k-th row and p+l-th column in G, is set to one if the k-th bit of the n-bit key is used for the XOR operation in the hash function used by j-th sub-block, in a specific order, of a certain block to calculate p-th bit of the hash value, and if l=0 when j=1, otherwise $l=\Sigma_{i=1}^{j-1}m_i$, where $m_j$=m or q that is the bit-length of the hash value generated by the hash function used by the j-th sub-block, and where q is the remainder when n is divided by m, otherwise the element in G is set to zero.

14. The method according to claim 1, wherein the number of the sub-blocks is the same among the blocks.

15. The method according to claim 1, wherein each sub-block further stores data associated with a key.

16. The method according to claim 1, wherein the same hash function is used in the j-th sub-blocks, in a specific order, of different blocks in the plural blocks.

17. The method according to claim 1, the method further comprising building a hash table by using memory blocks in a Field Programmable Gate Array.

18. The method according to claim 1, further comprising:
inserting a key into the hash table by determining, using a hash function, a position in the sub-block of an inserting key and inserting the key into the determined position;
retrieving a key from the hash table by determining, using the hash function, a possible position in the sub-block where there is possibility that a retrieving key is stored and retrieving the key which exists in the determined position; or
deleting a key from the hash table by determining, using the hash function, a possible position in the sub-block where there is possibility that a deleting key is stored and deleting the key which exists in the determined position.

19. The method according to claim 18, wherein the insertion of the key comprises selecting an empty memory slot of a sub-block, wherein the memory slot is determined by the hash function and putting the key into the slot.

20. The method according to claim 19, wherein the selection of the empty memory slot and putting of the key comprises, when there are plural sub-blocks having an empty memory slot, selecting a sub-block, based on a specific order, selecting the empty memory slot of the selected sub-block and putting the key into the slot.

21. The method according to claim 18, wherein the retrieval of data comprises determining whether the key stored in the memory slot determined by the hash function in the sub-block is the same with the retrieving key or not.

22. The method according to claim 18, wherein the deletion of the determined key comprises:

retrieving a deleting key e in the hash table; and
copying the element of a slot of a sub-block of which a specific order is the same with a sub-block where the deleting key was found and which the sub-block is in the current block b to the slot of a sub-block of which the specific order is the same with the sub-block where the deleting key was found and which the latter sub-block is in the block b-1 placed before the current block b.

23. A system having improved computer processor efficiency by building a hash table having memory space efficiency and high throughput, comprising:
a processor; and
a memory storing a program, which, when executed on the processor, performs an operation for building a hash table, the operation comprising:
dividing a hash table into plural blocks, the plural blocks including a set of memory slots configured to store hash keys and corresponding key values; and
dividing each block into plural sub-blocks, each sub-block having a sub-set of the set of memory slots, wherein a certain sub-block uses a first pattern of association between a key and a location for storing the key, and another sub-block which belongs to the same block comprising the certain sub-block uses a second pattern which is different from the first pattern.

24. A computer program product for improving an efficiency of a computer processor by building a hash table having memory space efficiency and high throughput, the computer program product comprising a computer usable storage medium having program instructions embodied therewith, wherein the computer readable storage medium is not a transitory signal, the program instructions executable by a computer to cause the computer to perform a method comprising:
dividing a hash table into plural blocks, the plural blocks including a set of memory slots configured to store hash keys and corresponding key values; and
dividing each block into plural sub-blocks, each sub-block having a sub-set of the set of memory slots, wherein a certain sub-block uses a first pattern of association between a key and a location for storing the key, and another sub-block which belongs to the same block comprising the certain sub-block uses a second pattern which is different from the first pattern.

* * * * *

UNITED STATES PATENT AND TRADEMARK OFFICE
CERTIFICATE OF CORRECTION

PATENT NO. : 10,229,145 B2  
APPLICATION NO. : 14/841458  
DATED : March 12, 2019  
INVENTOR(S) : Raymond H. Rudy and Takanori Ueda Page 1 of 1

It is certified that error appears in the above-identified patent and that said Letters Patent is hereby corrected as shown below:

On the Title Page

Item (72) Inventors: DELETE "Raymond H. Rudy" and INSERT --Rudy Raymond Harry Putra--

Signed and Sealed this  
Eleventh Day of August, 2020

Andrei Iancu  
*Director of the United States Patent and Trademark Office*